US009518634B2

(12) United States Patent
Masui

(10) Patent No.: US 9,518,634 B2
(45) Date of Patent: Dec. 13, 2016

(54) MANUAL TRANSMISSION

(75) Inventor: Yuuki Masui, Okazaki (JP)

(73) Assignee: Aisin AI Co., Ltd., Nishio-Shi (JP)

( * ) Notice: Subject to any disclaimer, the term of this patent is extended or adjusted under 35 U.S.C. 154(b) by 213 days.

(21) Appl. No.: 14/131,796

(22) PCT Filed: Jul. 11, 2012

(86) PCT No.: PCT/JP2012/067732
§ 371 (c)(1),
(2), (4) Date: Mar. 21, 2014

(87) PCT Pub. No.: WO2013/008857
PCT Pub. Date: Jan. 17, 2013

(65) Prior Publication Data
US 2014/0245861 A1 Sep. 4, 2014

(30) Foreign Application Priority Data

Jul. 13, 2011 (JP) .................... 2011-154823

(51) Int. Cl.
*B60K 6/547* (2007.10)
*F16H 3/02* (2006.01)
(Continued)

(52) U.S. Cl.
CPC . *F16H 3/02* (2013.01); *B60K 6/48* (2013.01); *B60K 6/547* (2013.01); *B60W 50/082* (2013.01);
(Continued)

(58) Field of Classification Search
CPC ...... B60W 20/20; B60W 20/40; B60W 20/50; B60W 30/1843; B60W 2510/0676; B60W 2510/087; B60K 2006/4808; B60K 6/547
See application file for complete search history.

(56) References Cited

U.S. PATENT DOCUMENTS 4,621,536 A  11/1986 Takeuchi
6,295,487 B1  9/2001 Ono et al.
(Continued)

FOREIGN PATENT DOCUMENTS

DE  10 2007 052 261 A1  5/2009
EP   1 762 416 A2  3/2007
(Continued)

OTHER PUBLICATIONS

Extended European Search Report (Application No. 12812004.5) dated May 12, 2015.

*Primary Examiner* — William Kelleher
*Assistant Examiner* — Gregory Prather
(74) *Attorney, Agent, or Firm* — Burr & Brown, PLLC

(57) ABSTRACT

A manual transmission including an input shaft Ai to which power is input from an internal combustion engine E/G through a clutch UT and an output shaft Ao from which power is output to drive wheels. This transmission has a plurality of EV travel gear stages (different from the neutral) in which no power transmission system is established between the input shaft Ai and the output shaft Ao, and a plurality of E/G travel gear stages in which a power transmission system is established between the input shaft Ai and the output shaft Ao. This transmission has a connection changeover mechanism which establishes and breaks connection between the output shaft of the electric motor and the output shaft. When an EV travel gear stage is selected, a "connected state" is always realized. When an E/G travel gear stage is selected, a "disconnected state" is realized in some cases.

1 Claim, 26 Drawing Sheets

(51) Int. Cl.
*B60K 6/48* (2007.10)
*F16H 59/04* (2006.01)
*F16H 61/682* (2006.01)
*B60W 50/08* (2012.01)
*F16H 59/02* (2006.01)
*B60W 20/00* (2016.01)

(52) U.S. Cl.
CPC .......... *F16H 59/0217* (2013.01); *F16H 59/04* (2013.01); *F16H 61/682* (2013.01); *B60K 2006/4808* (2013.01); *B60W 20/00* (2013.01); *B60W 2540/16* (2013.01); *B60Y 2200/92* (2013.01); *B60Y 2400/71* (2013.01); *F16H 2059/0221* (2013.01); *Y02T 10/626* (2013.01); *Y02T 10/6221* (2013.01); *Y10S 903/902* (2013.01); *Y10T 74/19014* (2015.01)

(56) References Cited

U.S. PATENT DOCUMENTS

| | | | | |
|---|---|---|---|---|
| 6,704,627 | B2* | 3/2004 | Tatara | B60K 6/52 701/22 |
| 2002/0177504 | A1* | 11/2002 | Pels | B60K 6/36 477/3 |
| 2004/0147366 | A1* | 7/2004 | Aoki | B60K 6/44 477/6 |
| 2008/0111506 | A1* | 5/2008 | Muta | B60K 6/365 318/15 |
| 2010/0234174 | A1 | 9/2010 | Miyazaki et al. | |
| 2013/0151057 | A1* | 6/2013 | Matsubara | B60K 6/445 701/22 |
| 2013/0296112 | A1* | 11/2013 | Yamazaki | B60W 20/00 477/5 |
| 2014/0236410 | A1* | 8/2014 | Takizawa | B60K 6/445 701/22 |
| 2015/0087457 | A1* | 3/2015 | Hayashi | B60K 6/365 475/2 |

FOREIGN PATENT DOCUMENTS

| | | |
|---|---|---|
| FR | 2 689 821 A1 | 10/1993 |
| JP | 2000-224710 A1 | 8/2000 |
| JP | 2005-028968 A1 | 2/2005 |
| JP | 2005-054823 A1 | 3/2005 |
| JP | 2010-143579 A1 | 7/2010 |
| JP | 2010-208520 A1 | 9/2010 |
| JP | 2013-018416 A1 | 1/2013 |

* cited by examiner (a)

(b)

POSITION FOR EV

POSITION FOR EV-R

POSITION FOR 2-ND

POSITION FOR 3-RD

POSITION FOR 4-TH

POSITION FOR 5-TH

MANUAL TRANSMISSION

BACKGROUND OF THE INVENTION

Field of the Invention

The present invention relates to a manual transmission applied to a vehicle which has an internal combustion engine and an electric motor as power sources, and more particularly to a manual transmission applied to a vehicle which includes a friction clutch disposed between the output shaft of the internal combustion engine and the input shaft of the manual transmission.

Discription of Related Art

Conventionally, there has been widely known a so-called hybrid vehicle which includes an engine and an electric motor as power sources (see, for example, Japanese Patent Application Laid-Open (kokai) No. 2000-224710). In such a hybrid vehicle, there can be employed a structure in which the output shaft of the electric motor is connected to one of the output shaft of the internal combustion engine, the input shaft of a transmission, and the output shaft of the transmission. In the following description, drive torque from the output shaft of the internal combustion engine will be referred to as "engine drive torque," and drive torque from the output shaft of the electric motor as "motor drive torque."

In recent years, there has been developed a power transmission control apparatus applied to a hybrid vehicle which includes a manual transmission and a friction clutch (hereinafter referred to as an "HV-MT vehicle"). The term "manual transmission" used herein refers to a transmission which does not include a torque converter and whose gear stage is selected in accordance with the shift position of a shift lever operated by a driver (the manual transmission is denoted by MT). Also, the term "friction clutch" used herein refers to a clutch which is interposed between the output shaft of the internal combustion engine and the input shaft of the manual transmission and which is configured such that the engagement state of a friction plate changes in accordance with the operation quantity of a clutch pedal operated by the driver.

SUMMARY OF THE INVENTION

A hybrid vehicle can realize a state in which the vehicle travels by utilizing engine drive torque and motor drive torque (hereinafter referred to as "HV travel"). In recent years, there has been developed a hybrid vehicle which can realize not only such HV travel but also a state in which the vehicle travels by utilizing only the motor drive torque, while maintaining the internal combustion engine in a stopped state (a state in which the rotation of the output shaft of the internal combustion engine stops) (hereinafter referred to as "EV travel").

In order to enable an HV-MT vehicle to realize EV travel in a state in which a driver does not operate a clutch pedal (namely, in a state in which the clutch of the vehicle is engaged), it is necessary to drive the output shaft of the transmission by utilizing motor drive torque while maintaining a state in which the input shaft of the transmission does not rotate. In order to realize this, it is necessary to connect the output shaft of the electric motor to the output shaft of the transmission and to maintain the transmission in a "state in which no power transmission system is established between the input shaft of the transmission and the output shaft of the transmission."

Here, there is assumed a manual transmission which has an "input shaft to which power is input from an internal combustion engine (through a clutch)" and an "output shaft to which power is input from an electric motor (namely, to which the output shaft of the electric motor is always connected in a power transmissible manner)." In this manual transmission, motor drive torque can be arbitrarily transmitted to the output shaft of the manual transmission (accordingly, to drive wheels) irrespective of whether or not a power transmission system is established between the input shaft and the output shaft.

Accordingly, in order to realize not only HV travel but also the above-mentioned EV travel by utilizing such a manual transmission, the manual transmission must have not only "gear stages in which a power transmission system is established between the input shaft and the output shaft of the transmission" for HV travel (hereinafter referred to as "HV travel gear stages") but also a "gear stage in which no power transmission system is established between the input shaft and the output shaft of the transmission" for EV travel (gear stage different from the neutral) (hereinafter referred to as an "EV travel gear stage").

Namely, in this manual transmission, when the shift lever is moved on a shift pattern to one of HV travel shift completion positions corresponding to a plurality of HV travel gear stages, a power transmission system having a "speed reduction ratio" corresponding to the corresponding HV travel gear stage is established between the input shaft and the output shaft, and when the shift lever is moved on the shift pattern to an EV travel shift completion position (different from the neutral position) corresponding to the EV travel gear stage, no power transmission system is established between the input shaft and the output shaft.

Incidentally, the present applicant has already proposed a manual transmission for an HV-MT vehicle of such a type (see, for example, Japanese Patent Application No, 2011-154447). This application discloses a manual transmission which includes, as EV travel gear stages, an EV travel gear stage for forward travel (corresponding to 1-st for forward starting) and an EV travel gear stage for reverse travel (corresponding to a gear stage for reverse starting) on the shift pattern. This configuration allows a driver to perform forward starting and reverse starting while utilizing EV travel. As a result, a gear pair for 1-st for forward travel (specifically, a combination of a fixed gear for 1-st and a free-rotating gear for 1-st which are always meshed with each other) and a pair for reverse travel (specifically, a combination of a fixed gear for reverse travel, a free-rotating gear for reverse travel, an idle gear, etc.) can be eliminated. Accordingly, the entirety of the transmission can be made compact.

According to the structure disclosed in this application, the output shaft of the electric motor is always connected to the output shaft of the transmission in a power transmissible manner. According, for example, when a gear stage for high speed travel among the HV travel gear stages is established and the vehicle is traveling at high speed, the electric motor is continuously operated at high speed. This may raise a problem in that the temperature of the electric motor is likely to become excessively high.

The present invention was made to solve such a problem, and its object is to provide a manual transmission which has "HV travel gear stages" and "EV travel gear stages" and which can restrain occurrence of a situation in which the temperature of an electric motor becomes excessively high.

A manual transmission according to the present invention is the above-described manual transmission, and is characterized by comprising a connection changeover mechanism which selectively realizes a connected state in which the output shaft of the electric motor is connected to the output shaft of the transmission in a power transmissible manner and a disconnected state in which the output shaft of the electric motor is not connected to the output shaft of the transmission in a power transmissible manner, wherein the connected state is always realized when the shift operation member is located at each of the shift completion positions of the motor travel gear stages for forward travel and reverse travel, and the disconnected state is realized when the shift operation member is located at each of the shift completion positions of the E/G travel gear stages.

By virtue of this configuration, when an HV travel gear stage is selected, there can be realized a state in which the output shaft of the electric motor is disconnected from the output shaft of the transmission. Accordingly, occurrence of the above-described situation in which the electric motor is continuously operated at high speed can be restrained. As a result, occurrence of a situation in which the temperature of the electric motor becomes excessively high can be restrained.

DEATAILED DESCRIPTION OF THE INVENTION

Figure 1:
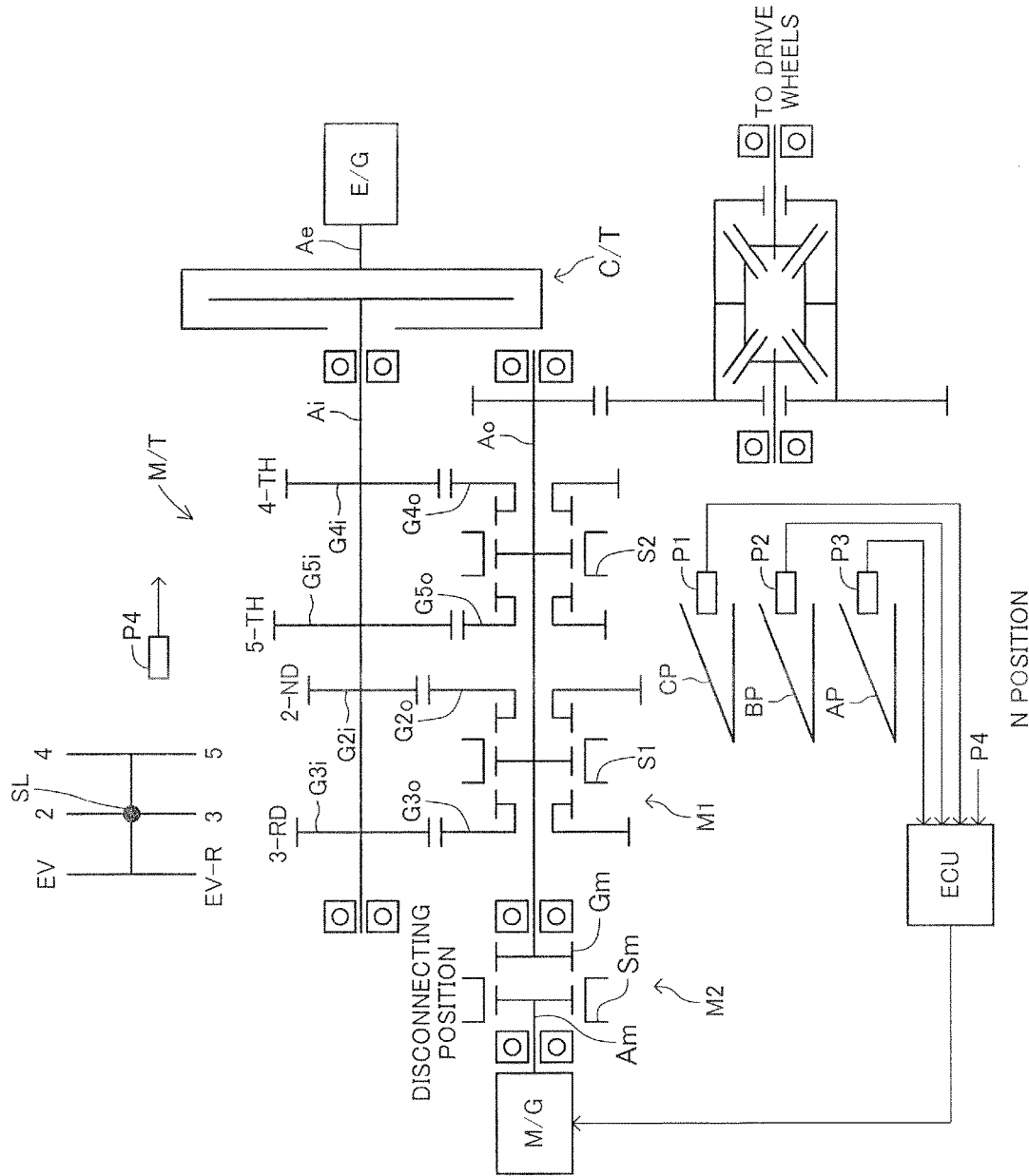
FIG. 1 is a schematic diagram of a power transmission control apparatus for an HV-MT vehicle according to an embodiment of the present invention in a state in which an N position is selected.

A power transmission control apparatus of a vehicle which includes a manual transmission according to an embodiment of the present invention (hereinafter referred to as the "present apparatus") will now be described with reference to the drawings. As shown in FIG. 1, the present apparatus is applied to a "vehicle which includes an engine E/G and a motor generator M/G as power sources, and also includes a manual transmission M/T, which does not include a torque converter, and a friction clutch C/T"; i.e., the above-described "HV-MT vehicle." This "HV-MT vehicle" may be a front wheel drive vehicle, a rear wheel drive vehicle, or a four wheel drive vehicle.

(Overall Structure)

First, the overall structure of the present apparatus will be described. The engine E/G is a well known internal combustion engine, such as a gasoline engine which uses gasoline as fuel, or a diesel engine which uses light oil as fuel.

The manual transmission M/T is a transmission which does not include a torque converter and whose gear stage is selected in accordance with the shift position of a shift lever SL operated by a driver. The manual transmission M/T has an input shaft Ai to which power is input from an output shaft Ae of the engine E/G, an output shaft Ao from which power is output to drive wheels of the vehicle, and an MG shaft Am to which power is input from the motor generator M/G. The input shaft Ai, the output shaft Ao, and the MG shaft Am are disposed parallel with one another. In the example shown in FIG. 1, the MG shaft Am is disposed coaxially with the input shaft Ai. The details of the structure of the manual transmission M/T will be described later. The details of the structure of the manual transmission M/T will be described later.

The friction clutch C/T is disposed between the output shaft Ae of the engine E/G and the input shaft Ai of the manual transmission M/T. The friction clutch C/T is a well known clutch configured such that the engagement state of a friction plate (more specifically, the axial position of a friction plate, which rotates together with the input shaft Ai, in relation to a fly-wheel, which rotates together with the output shaft Ae) changes in accordance with an operation quantity (depression amount) of a clutch pedal CP operated by the driver.

The engagement state of the friction clutch C/T (the axial position of the friction plate) may be mechanically adjusted in accordance with the operation quantity of the clutch pedal CP, by making use of a link mechanism or the like which mechanically connects the clutch pedal CP to the friction clutch C/T (the friction plate). Alternatively, the engagement state of the friction clutch C/T may be electrically adjusted by making use of drive force of an actuator which operates in accordance with the result of detection by a sensor (a sensor P1 to be described later) which detects the operation quantity of the clutch pedal CP (by a so-called by-wire scheme).

The motor generator M/G has a well known structure (e.g., an AC synchronous motor), and, for example, its rotor (not illustrated) rotates together with the MG shaft Am. In the following description, drive torque from the output shaft Ae of the engine E/G will be referred to as "EG torque," and drive torque from the MG shaft Am (torque from the output shaft of the motor generator M/G) as "MG torque."

The present apparatus includes a clutch operation quantity sensor P1 which detects the operation quantity (depression amount, clutch stroke, etc.) of the clutch pedal CP, a brake operation quantity sensor P2 which detects the operation quantity (depression force, presence/absence of operation, etc.) of a brake pedal BP, an accelerator operation quantity sensor P3 which detects the operation quantity (accelerator opening) of an accelerator pedal AP, and a shift position sensor P4 which detects the position of the shift lever SL.

Moreover, the present apparatus includes an electronic control unit (hereinafter simply referred to as the "ECU"). On the basis of information, among others, from the above-mentioned sensors P1 to P4 and other sensors, etc., the ECU controls the EG torque by controlling the fuel injection amount of the engine E/G (opening of its throttle valve) and controls the MG torque by controlling an inverter (not shown).

(Structure of the Manual Transmission M/T)

The structure of the manual transmission M/T will be described specifically with reference to FIGS. 1 to 4. As shown in FIGS. 1 and 4, the shift pattern of the shift lever SL employed in the present example is a so-called "H-type" shift pattern which is composed of a single selection line (a line extending in the left-right direction of the vehicle) and three shift lines (lines extending in the front-rear direction of the vehicle) intersecting with the selection line.

In the present example, five forward gear stages (EV, 2-nd through 5-th) and a single reverse gear stage (EV-R) are provided as selectable gear stages (shift completion positions). "EV" and "EV-R" are the above-described EV travel gear stages, and "2-nd" through "5-th" are the above-described HV travel gear stages. In the following, in order to facilitate description, a range in which the selection operation can be performed and which includes an "N position," a "first selection position," and a "second selection position" will be collectively referred to as a "neutral range."

The manual transmission M/T includes sleeves S1, S2, and Sm. The sleeves S1 and S2 are a sleeve for "2-nd-3-rd" and a sleeve for "4-th-5-th" which are fitted onto corresponding hubs which rotate together with the output shaft Ao such that the sleeves cannot rotate relative to the corresponding hubs but can move in the axial direction relative to the corresponding hubs. The sleeve Sm is a sleeve for changing the connection state of the MG shaft Am. The sleeve Sm is fitted onto a hub which rotates together with the MG shaft Am such that the sleeve Sm cannot rotate relative to the hub but can move in the axial direction relative to the hub.

Figure 2:
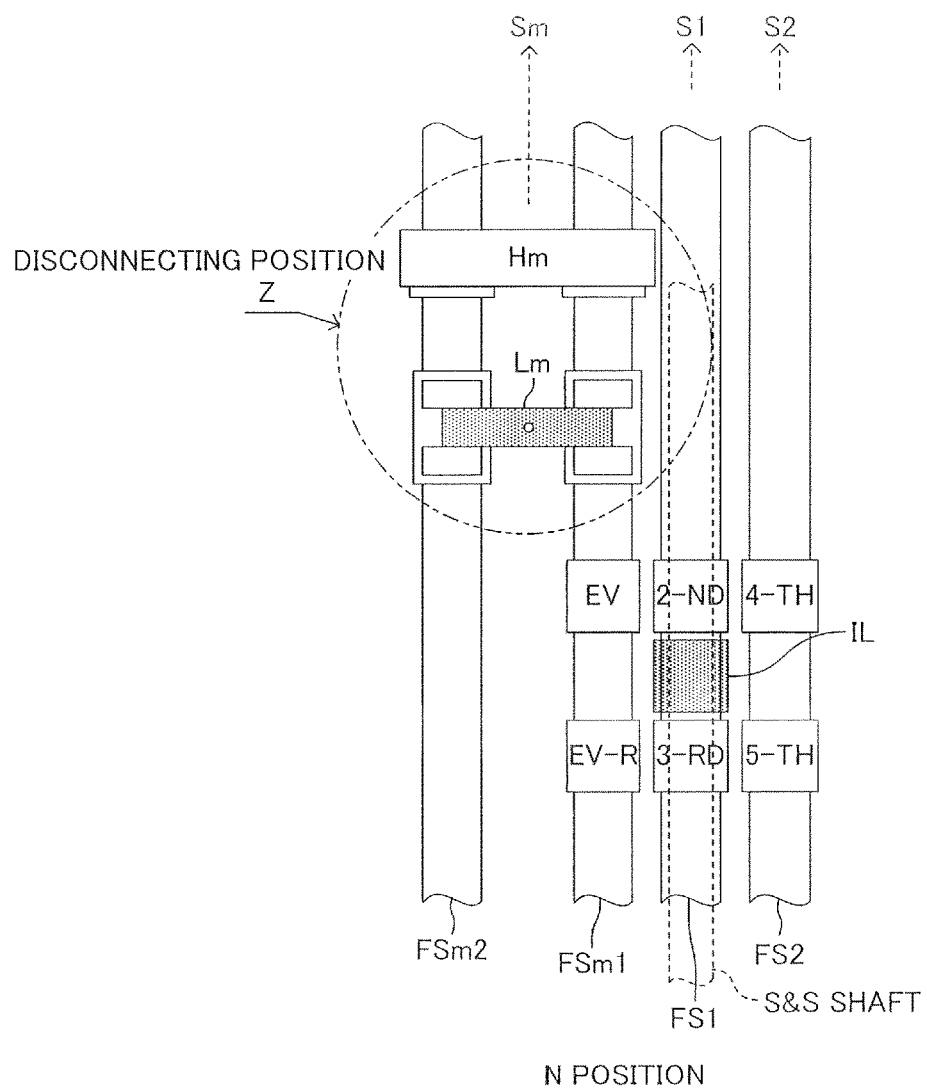
FIG. 2 is a schematic view showing the positional relation between an S&S shaft and a plurality of fork shafts in a state in which the N position is selected.
Figure 3:
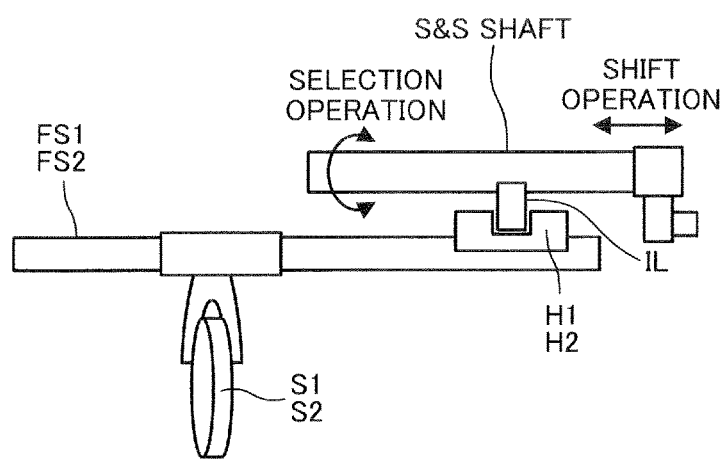
FIG. 3 is a schematic view showing the state of engagement between "sleeves and fork shafts" and an S&S shaft.
Figure 3:
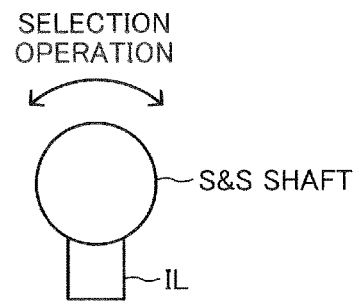
Figure 4:
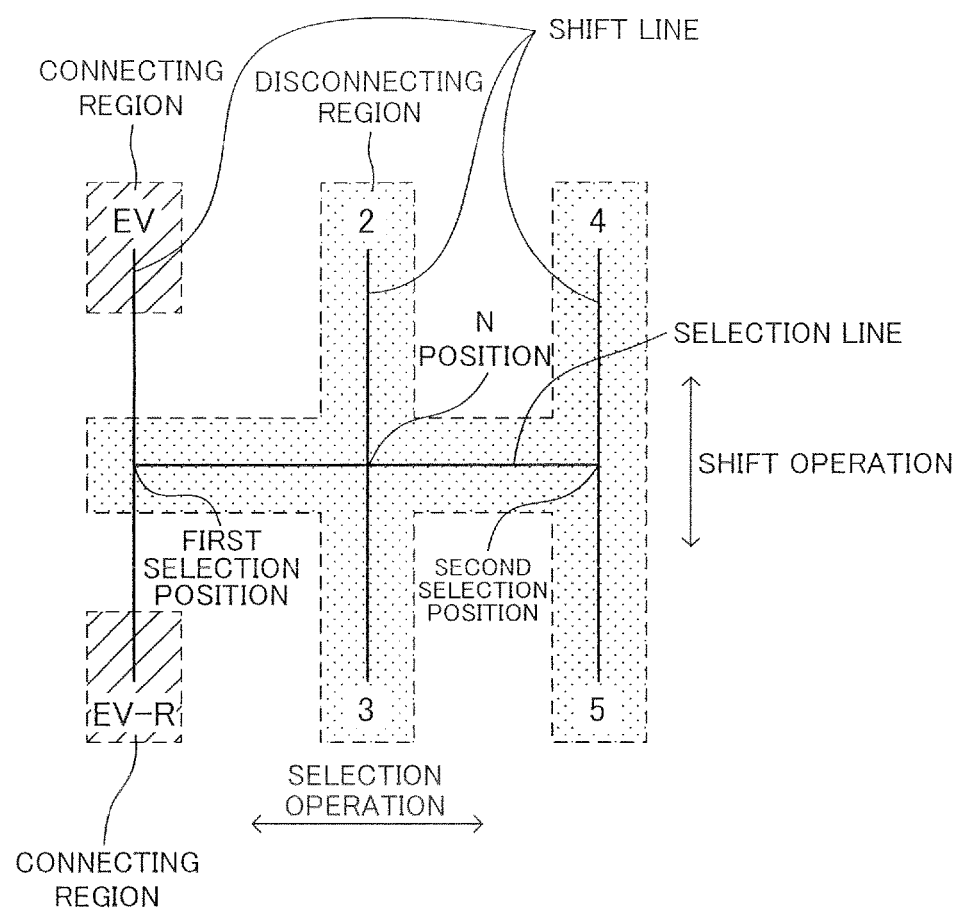
FIG. 4 is a diagram used for describing a shift pattern, and a "connecting region" and a "disconnecting region" on the shift pattern.

As shown in FIGS. 2 and 3, the sleeves S1 and S2 are integrally coupled with fork shafts FS1 and FS2, and the sleeve Sm is integrally coupled with a movable member Hm. The fork shafts FS1 and FS2 and the movable member Hm (i.e., the sleeves S1, S2, Sm) are driven in the axial direction (in the vertical direction in FIG. 2 and in the left-right direction in FIGS. 1 and 3) by an inner lever IL (see FIGS. 2 and 3) provided on an S&S shaft which moves as a result of operation of the shift lever SL (the details will be described later).

In FIGS. 2 and 3, the S&S shaft is a "selection rotation type." Namely, the S&S shaft is translated in the axial direction as a result of a shift operation (operation in the vertical direction in FIGS. 1 and 4) of the shift lever SL, and is rotated about the axis thereof as a result of a selection operation (operation in the left-right direction in FIGS. 1 and 4) of the shift lever SL. However, the S&S shaft may be a "shift rotation type" S&S shaft which is rotated about the axis as a result of a shift operation of the shift lever SL and is translated in the axial direction as a result of a selection operation of the shift lever SL.

As shown in FIG. 3, corresponding shift heads (a shift head for 2-nd and 3-rd and a shift head for 4-th and 5-th) are integrally provided on the fork shafts FS1 and FS2. When the position of the shift lever SL moves toward the front side or rear side of the vehicle from the "N position" or the "second selection position" as a result of a shift operation (operation in the front-rear direction of the vehicle); i.e., when the axial position (position in the left-right direction in FIG. 3) of the inner lever IL moves toward the front side or the rear side from a reference position corresponding to the "N position" or the "second selection position" of the shift lever SL, the inner lever IL pushes the corresponding shift head in the axial direction, whereby the fork shaft FS1 or FS2 (i.e., the sleeve S1 or S2) moves in the corresponding direction from the "neutral position."

Meanwhile, even when the position of the shift lever SL moves toward the front side or rear side of the vehicle from the "first selection position" as a result of a shift operation; i.e., even when the axial position of the inner lever IL moves toward the front side or the rear side from the reference position corresponding to the "first selection position" of the shift lever SL, there exists no fork shaft whose shift head engages with the inner lever IL. Accordingly, the fork shafts FS1 and FS2 (i.e., the sleeves S1 and S2) are maintained at their "neutral positions."

Meanwhile, the manual transmission MIT has first and second shafts FSm1 and FSm2. A corresponding head (EV and EV-R) is integrally provided on the shaft FSm1. When the position of the shift lever SL moves toward the front side or rear side of the vehicle from the "first selection position" as a result of a shift operation; i.e., when the axial position of the inner lever IL moves toward the front side or the rear side from a reference position corresponding to the "first selection position" of the shift lever SL, the inner lever IL pushes the corresponding head in the axial direction, whereby the shaft FSm1 moves in the corresponding direction from the "neutral position."

<Changeover of the Connection State of the MG Shaft>

First, changeover of the connection state of the MG shaft will be described with reference to FIGS. 4 to 9. As shown in FIG. 4, a "disconnecting region" (see a region indicated by fine dots) and a "connecting region" (see a region indicted by oblique lines) are defined.

The changeover of the connection state of the MG shaft is performed when the position of the shift lever SL moves from the "disconnecting region" to the "connecting region" (or vice versa) during a shift operation. This point will next be described with reference to FIGS. 5 to 9.

Figure 5:
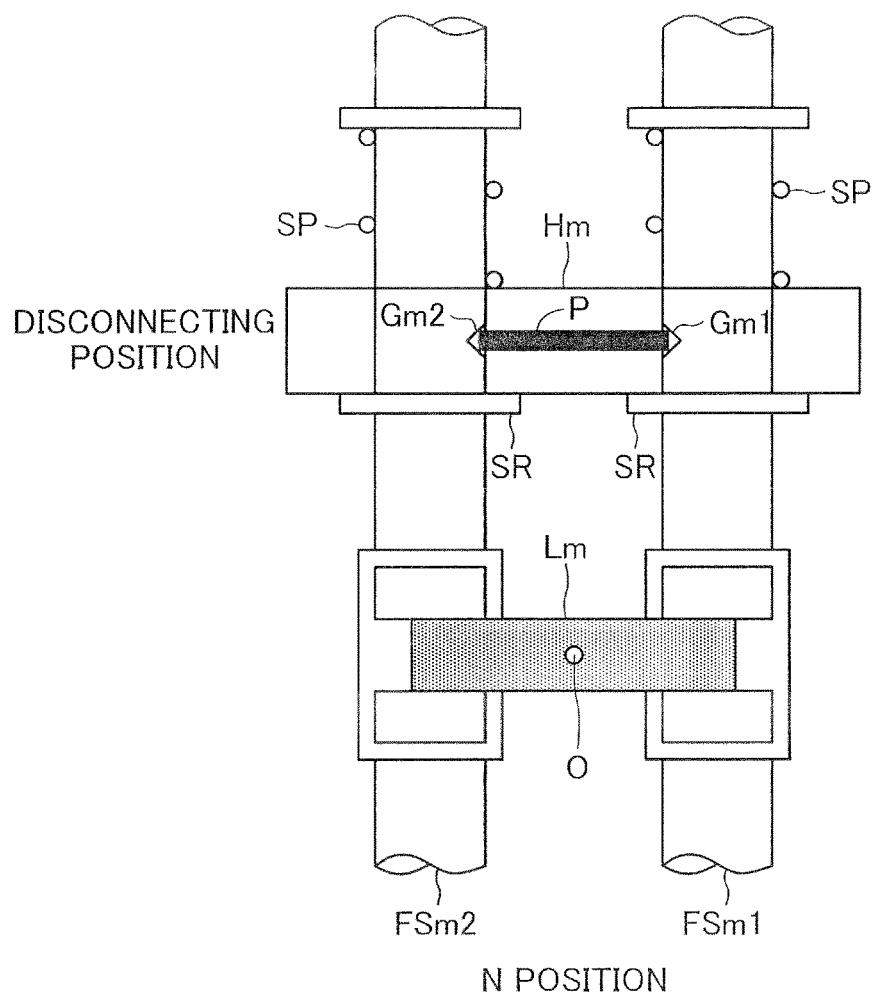
FIG. 5 is an enlarged view of a portion Z of FIG. 2 showing the state (disconnected state) of a connection changeover mechanism in a state in which an N position is selected.

As shown in FIG. 5, the first and second shafts FSm1 and FSm2 which are disposed parallel to each other are inserted into corresponding through holes formed in the movable member Hm such that they can move in the axial direction (the vertical direction in FIG. 5) relative to the movable member Hm. Downward movement of the movable member Hm in FIG. 5 relative to the shafts FSm1 and FSm2 is restricted by snap rings SR fixed to the shafts FSm1 and FSm2. The movable member Hm is always urged by the springs SP provided on the shafts FSm1 and FSm2 to move downward in FIG. 5 relative to the shafts FSm1 and FSm2.

A pin P is inserted into the movable member Hm such that the pin P can move in the left-right direction in FIG. 5. In a state in which the movable member Hm rests on the snap rings SR, the pin P is selectably engageable with a groove Gm1 formed on the side surface of the shaft FSm1 and a groove Gm2 formed on the side surface of the shaft FSm2.

The shafts FSm1 and FSm2 are coupled with opposite ends of a lever Lm which rotates about a fulcrum O. When the shaft FSm1 moves toward one side along the axial direction (the vertical direction in FIG. 5), the shaft FSm2 moves toward the other side along the axial direction.

FIG. 5 shows a state in which the shift lever SL is located at the N position (more precisely, the neutral range). In this state, both of the shafts FSm1 and FSm2 are located at their neutral positions. The movable member Hm can move relative to the shafts FSm1 and FSm2. However, by the urging forces of the springs SP, the movable member Hm is fixed at a position where the movable member Hm rests on the snap rings SR. The pin P is in a state in which it engages with none of the grooves Gm1 and Gm2. In the following description, for the movable member Hm and the sleeve Sm united with the movable member Hm, this position will be referred to as a "disconnecting position."

As shown in FIG. 1, when the sleeve Sm is located at the disconnecting position, the sleeve Sm is disengaged from a fixed gear Gm provided on the output shaft Ao. As a result, the MG shaft Am is disconnected from the output shaft Ao (the MG shaft Am is not connected to the output shaft Ao in a power transmissible manner). In this manner, when the shift lever SL is located at the N position (more precisely, the neutral range), "the disconnected state" is realized.

Figure 6:
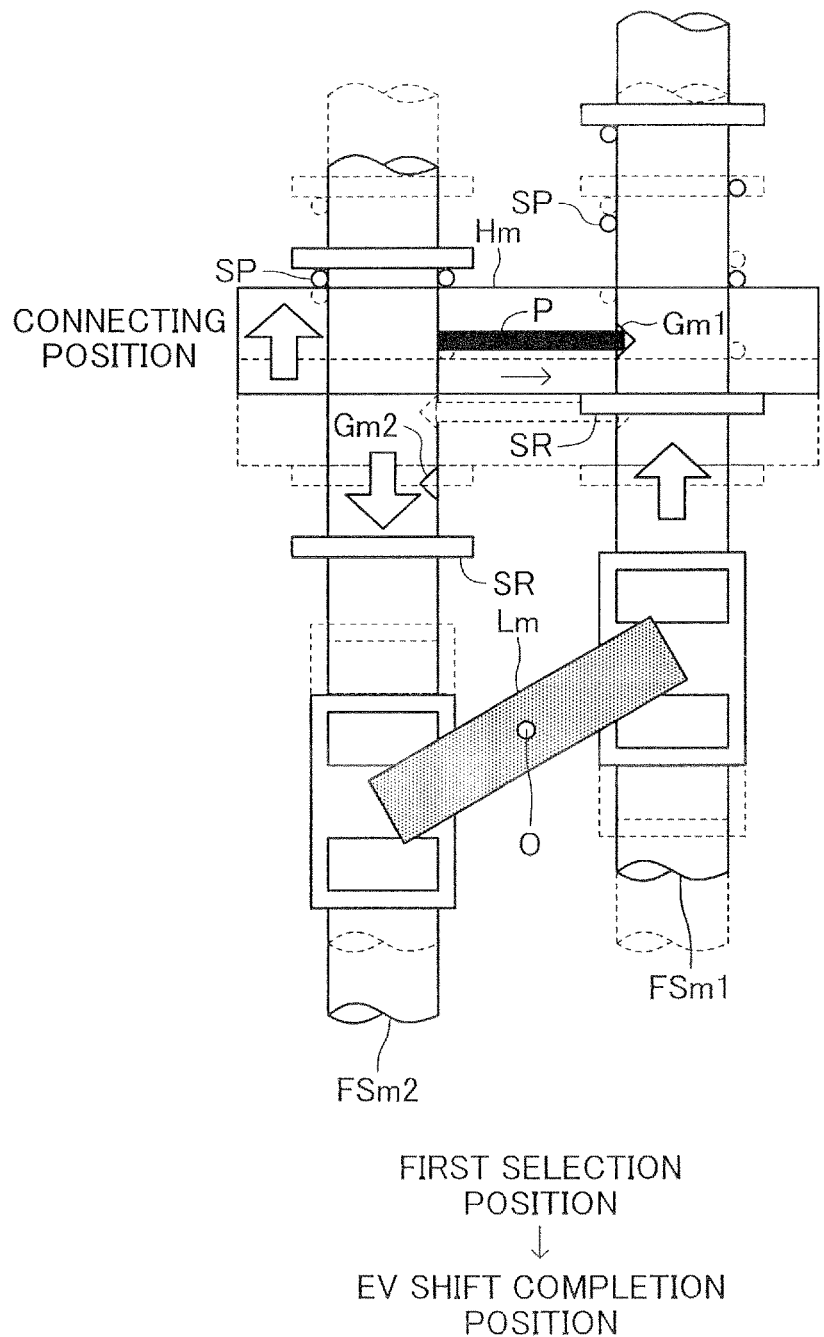
FIG. 6 is a view corresponding to FIG. 5 and used for describing an operation when changeover from a disconnected state to a connected state is performed as a result of a shift operation from a first selection position to an EV shift completion position.

FIG. 6 shows a state in which the shift lever SL moves from the neutral range (more precisely, the first selection position) to an EV shift completion position. In this case, the shaft FSm1 is driven upward in FIG. 6 as a result of being pushed by the inner lever SL. As result, due to the action of the snap ring SR fixed to the shaft FSm1, the movable member Hm moves upward in FIG. 6 together with the shaft FSm1. Meanwhile, due to the action of the lever Lm, the shaft FSm2 moves downward in FIG. 6. As a result, although the position of the pin P in the vertical direction still coincides with that of the groove Gm1, the position of the pin P in the vertical direction deviates from that of the groove Gm2. Therefore, the pin P moves rightward in FIG. 6 and comes into engagement with the groove Gm1 only, whereby the movable member Hm is fixedly coupled with the shaft FSm1 (the movable member Hm is still movable relative to the shaft FSm2).

Since the movable member Hm is fixedly coupled with the shaft FSm1 as described above, the movable member Hm (i.e., the sleeve Sm) moves upward in FIG. 6 from the "disconnecting position" as a result of movement (upward movement in FIG. 6) of the shaft FSm1 from the neutral position to an EV position. In the following description, for the movable member Hm and the sleeve Sm, this position will be referred to as a "connecting position."

Figure 10:
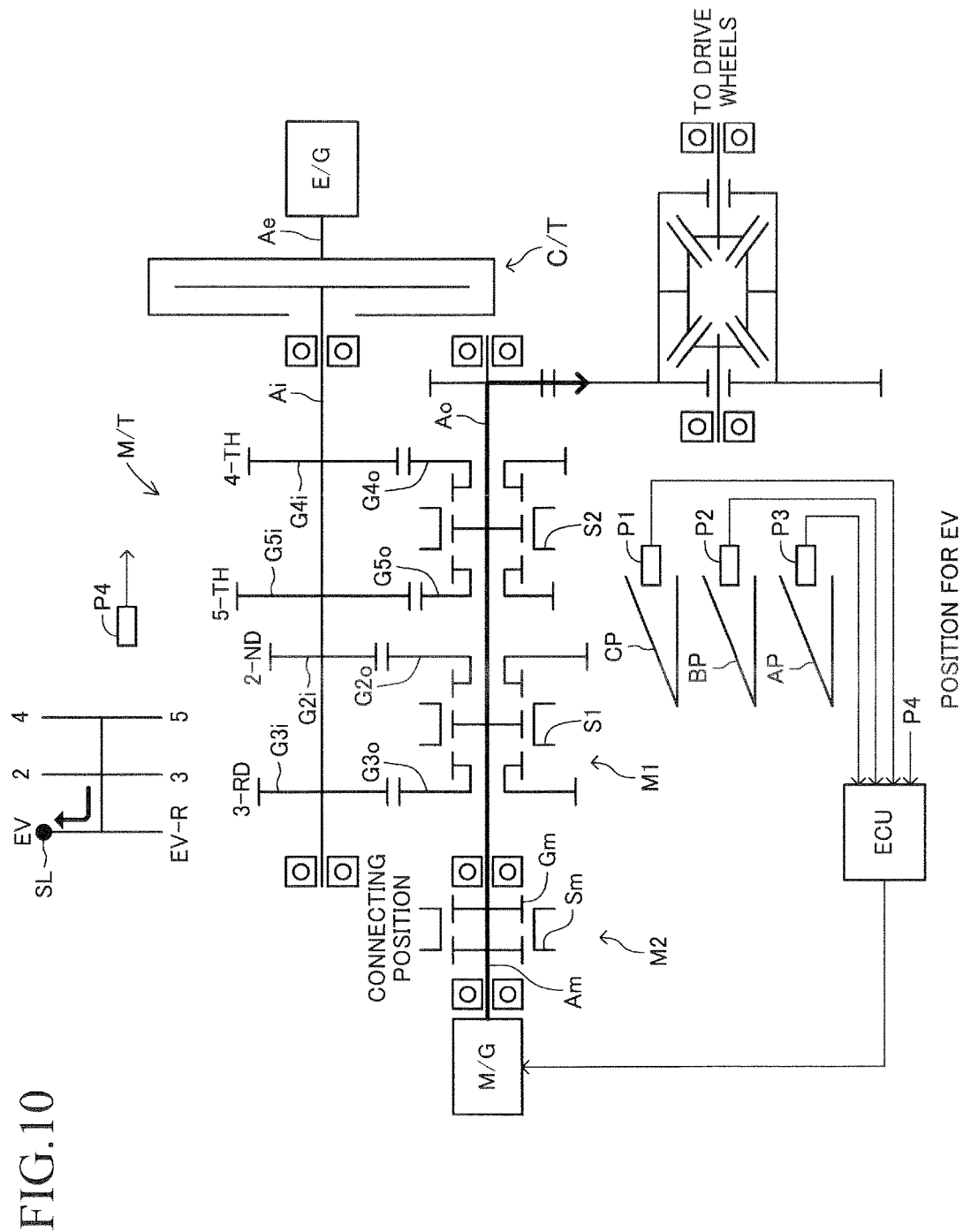
FIG. 10 is a diagram corresponding to FIG. 1 in a state in which a position for EV is selected.

As shown in FIG. 10 to be described later, when the sleeve Sm is located at the connecting position, the sleeve Sm is engaged with the fixed gear Gm provided on the output shaft Ao. As a result, the MG shaft Am is fixedly connected to the output shaft Ao (the MG shaft Am is connected to the output shaft Ao in a power transmissible manner). In this manner, when the shift lever SL moves from the first selection position to the EV shift completion position, the connection state of the MG shaft is changed from "the disconnected state" to the "connected state."

Figure 7:
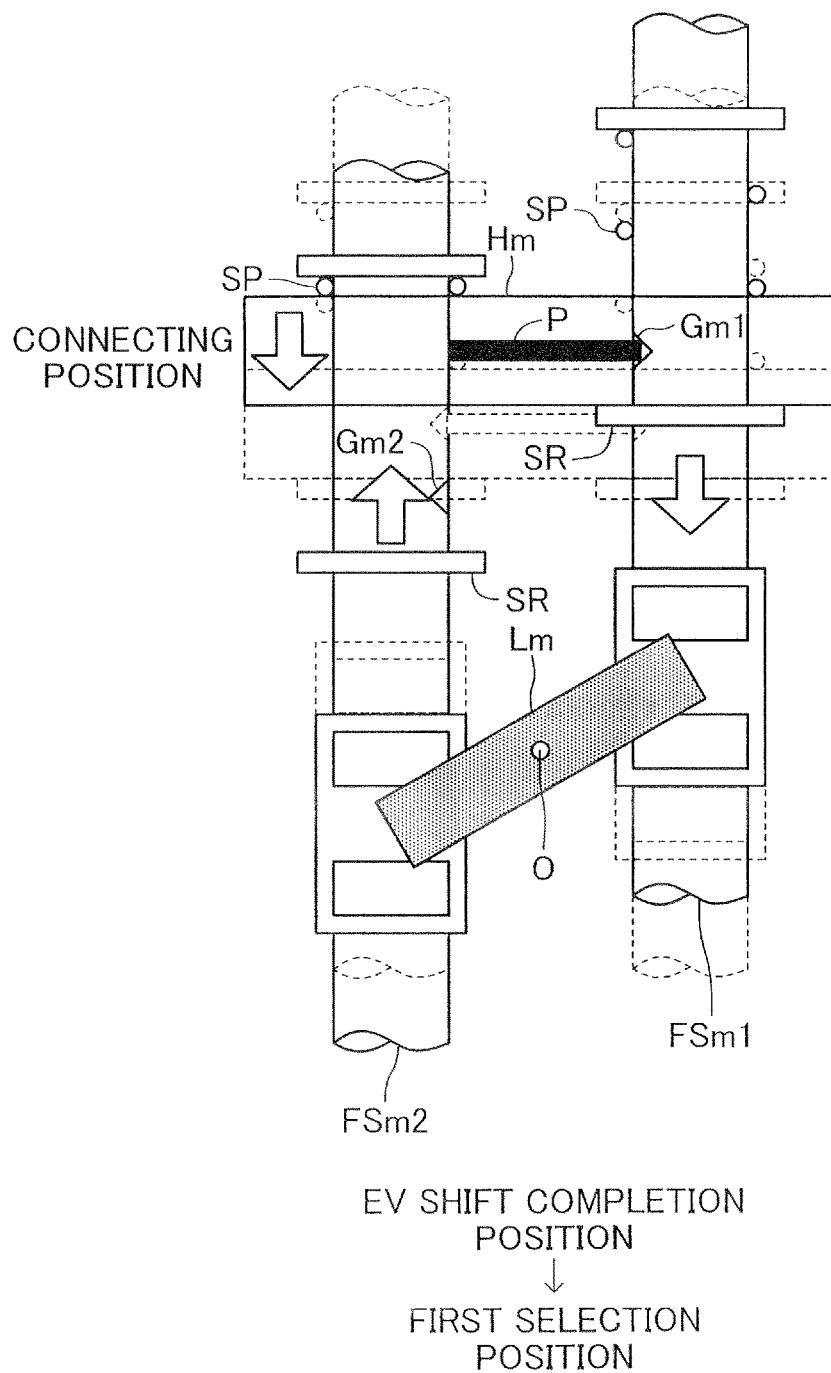
FIG. 7 is a view corresponding to FIG. 5 and used for describing an operation when changeover from the connected state to the disconnected state is performed as a result of a shift operation from the EV shift completion position to the first selection position.

FIG. 7 shows a state in which the shift lever SL returns from the EV shift completion position to the neutral range (more precisely, the first selection position). In this case, the shaft FSm1 returns from the EV position to the neural position as a result of being pushed by the inner lever SL. As a result, the movable member Hm which is united with the shaft FSm1 also returns from the "connecting position" to the "disconnecting position," and the shaft FSm2 also returns to the neutral position. Namely, the state shown in FIG. 5 is obtained again. In this manner, when the shift lever SL returns from the EV shift completion position to the first selection position, the connection state of the MG shaft returns from the "connected state" to the "disconnected state."

Figure 8:
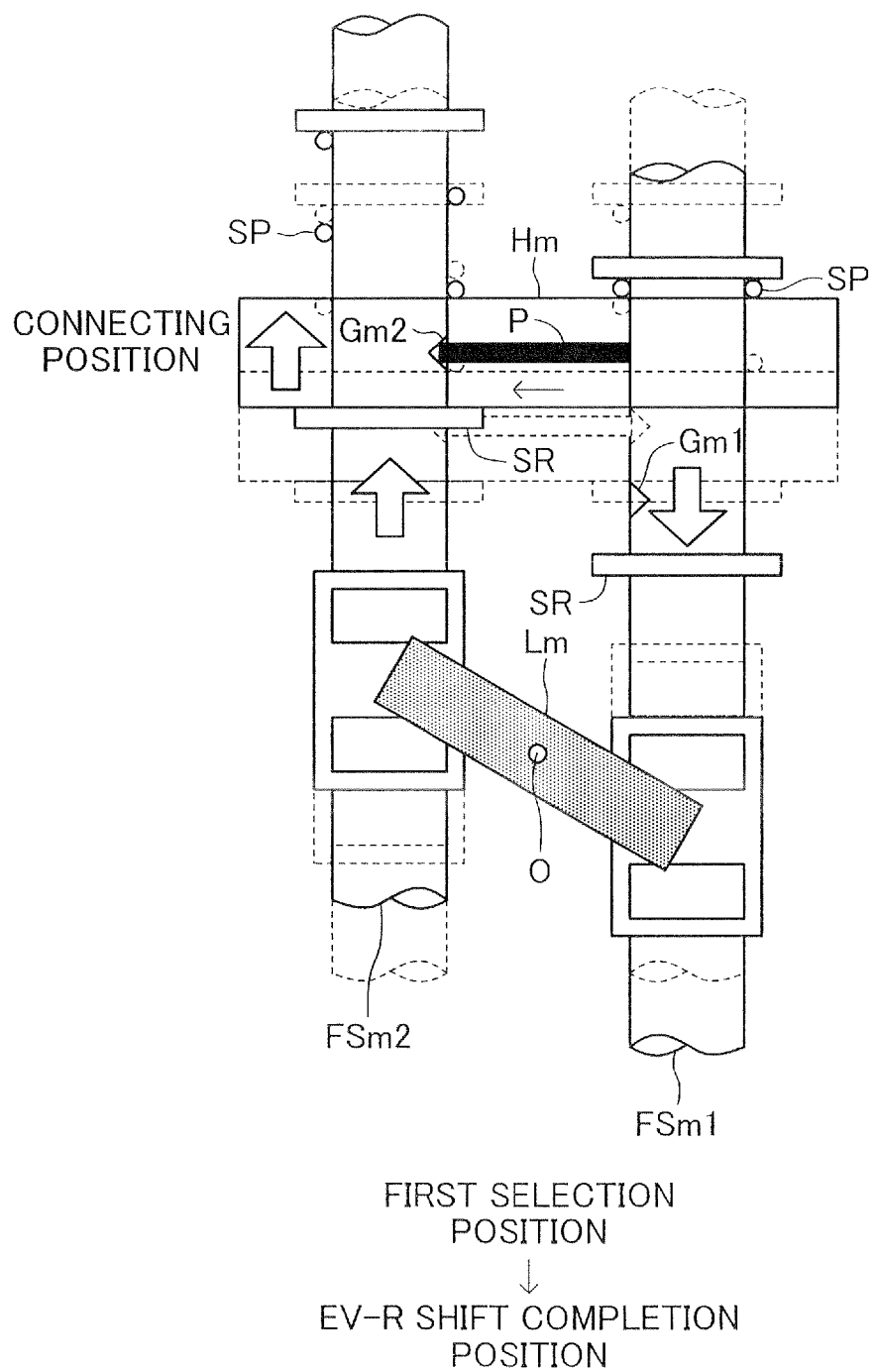
FIG. 8 is a view corresponding to FIG. 5 and used for describing an operation when changeover from the disconnected state to the connected state is performed as a result of a shift operation from the first selection position to a 2-nd shift completion position.

FIG. 8 shows a state in which the shift lever SL moves from the neutral range (more precisely, the first selection position) to an EV-R shift completion position. In this case, the shaft FSm1 is driven downward in FIG. 8 as a result of being pushed by the inner lever SL, and the shaft FSm2 is driven upward in FIG. 8. As a result, by the action of the snap ring SR, the movable member Hm moves upward in FIG. 8 together with the shaft FSm2. Accordingly, although the position of the pin P in the vertical direction still coincides with that of the groove Gm2, the position of the pin P in the vertical direction deviates from that of the groove Gm1. Therefore, the pin P moves leftward in FIG. 8 and comes into engagement with the groove Gm2 only, whereby the movable member Hm is fixedly coupled with the shaft FSm2 (the movable member Hm is still movable relative to the shaft FSm1).

Since the movable member Hm is fixedly coupled with the shaft FSm2 as described above, the movable member Hm (i.e., the sleeve Sm) moves from the "disconnecting position" to the "connecting position" as a result of movement (downward movement in FIG. 8) of the shaft FSm1 from the neutral position to a 2-nd position; i.e., as a result of upward movement of the shaft FSm2 in FIG. 8 from the neutral position. In this manner, when the shift lever SL moves from the first selection position to the EV-R shift completion position, the connection state of the MG shaft is changed from "the disconnected state" to the "connected state."

Figure 9:
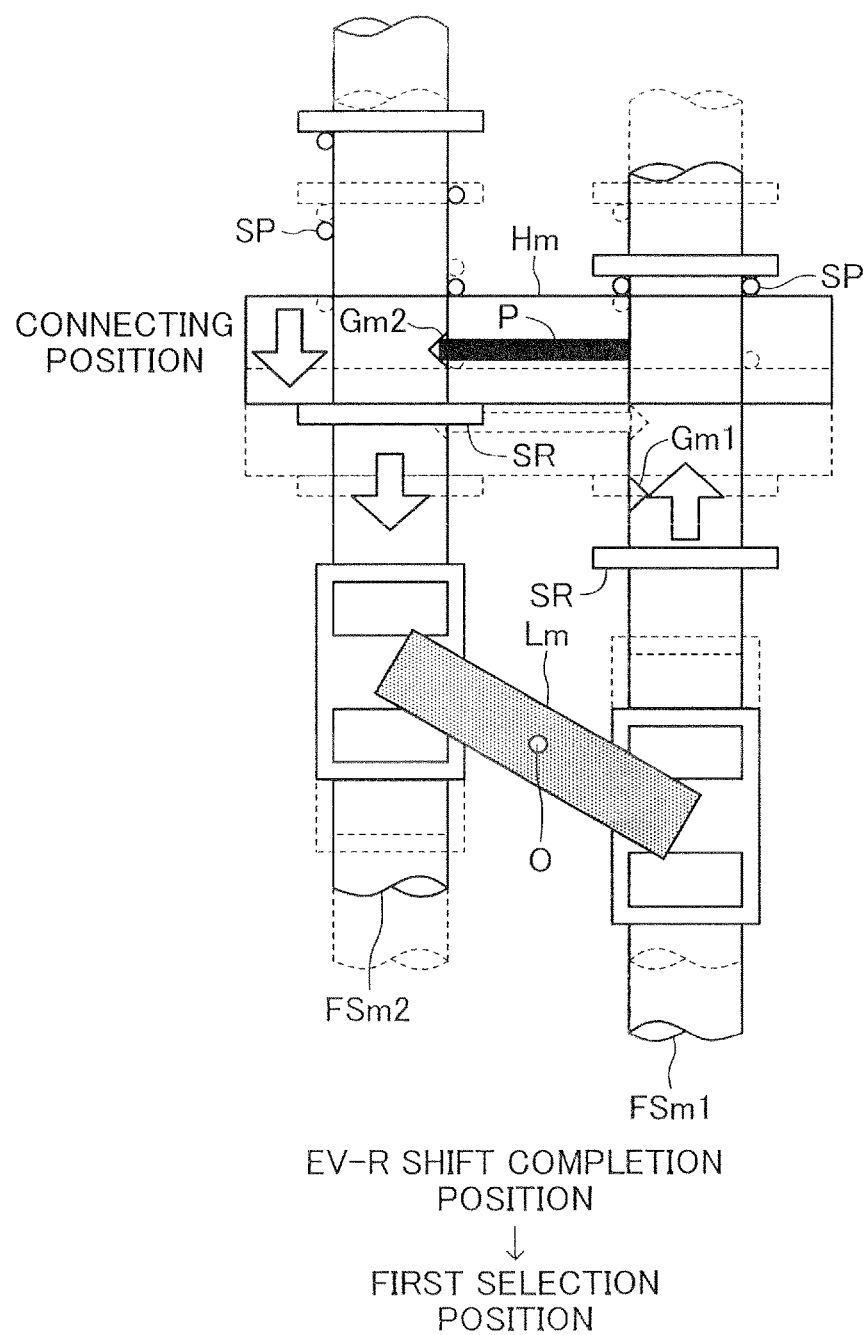
FIG. 9 is a view corresponding to FIG. 5 and used for describing an operation when changeover from the connected state to the disconnected state is performed as a result of a shift operation from the 2-nd shift completion position to the first selection position.

FIG. 9 shows a state in which the shift lever SL returns from the EV-R shift completion position to the N position (more precisely, the first selection position). In this case, the shaft FSm1 returns from the 2-nd position to the neural position as a result of being pushed by the inner lever SL, and the shaft FSm2 also returns to the neutral position. As a result, the movable member Hm which is united with the shaft FSm2 also returns from the "connecting position" to the "disconnecting position." Namely, the state shown in FIG. 5 is obtained again. In this manner, when the shift lever SL returns from the EV-R shift completion position to the first selection position, the connection state of the MG shaft returns from the "connected state" to the "disconnected state."

By virtue of the above-described configuration, when the shift lever SL is located in the disconnecting region on the shift pattern shown in FIG. 4, the "disconnected state" is maintained, and when the shift lever SL is located in the connecting region, the "connected state" is maintained. When the shift lever SL moves from the disconnecting region to the connecting region (or vice versa), changeover from the "disconnected state" to the "connected state" (or vice versa) is performed. More specifically, when the shift lever SL is located at the neutral position and when the shift lever SL moves from the neutral position to the shift completion position of a "gear stage other than EV and EV-R" (2-nd through 5-th) (or vice versa), the "disconnected state" is maintained. Meanwhile, when the shift lever SL moves from the neutral position to the shift completion position of "EV" or "EV-R" (or vice versa), the changeover from the "disconnected state" to the "connected state" (or vice versa) is performed.

As described above, the manual transmission MIT includes a connection changeover mechanism M2 which selectively realizes the "disconnected state" and the "connected state." The connection changeover mechanism M2 is configured by the sleeve Sm, the movable member Hm, the first and second shaft Shafts FSm1 and FSm2, the pin P, the grooves Gm1 and Gm2, the snap rings SR, the springs SP, the fixed gear Gm, etc.

<Changeover of the Gear Stage>

Next, the gear stages will be described one by one with reference to FIGS. 1, 2, and 10 to 21. Notably, in the following description, the state in which the shift lever SL is located at the shift completion position of a certain gear stage may be expressed by a phrase "that gear stage is selected."

As shown in FIGS. 1 and 2, in a state in which the shift lever SL is located at the "N position" (more precisely, within the neutral range), the sleeves S1 and S2 are located at their "neutral positions." In this state, the sleeves S1 and S2 do not engage with corresponding idle gears. Namely, no power transmission system is established between the input shaft Ai and the output shaft Ao. Also, as described above, in this state, the sleeve Sm is located at the "disconnecting position" (see also FIG. 5), and the MG torque is maintained at "zero." Accordingly, none of the EG torque and the MG torque is transmitted to the drive wheels.

Figure 11:
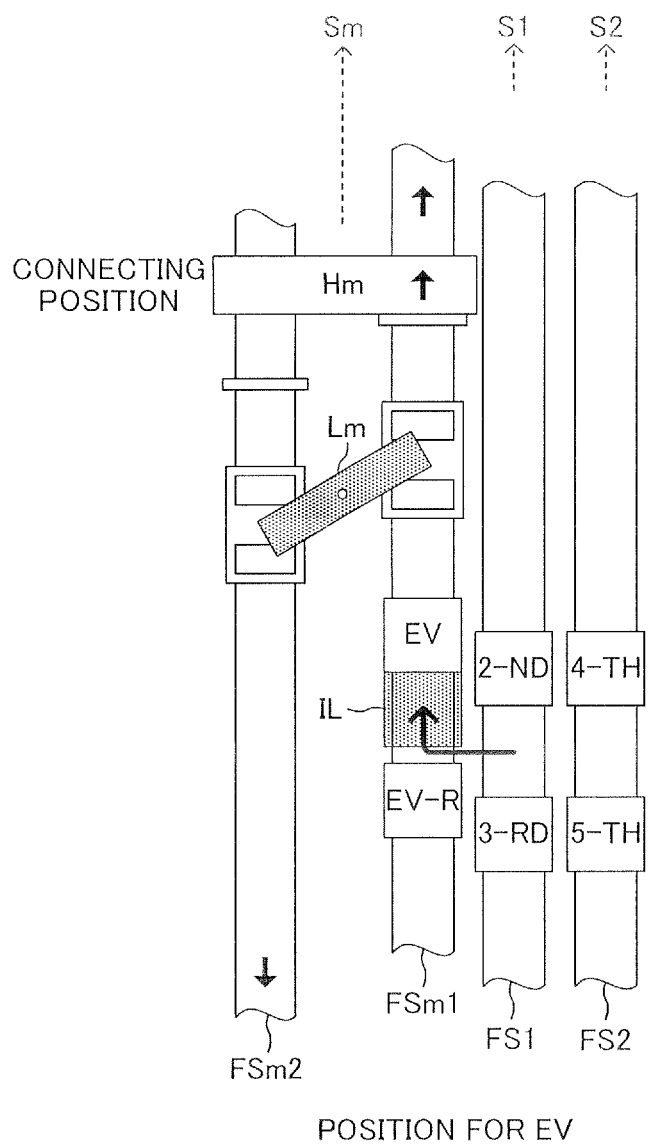
FIG. 11 is a diagram corresponding to FIG. 2 in a state in which the position for EV is selected.

As shown in FIGS. 10 and 11, in the case where the shift lever SL moves from the "N position" to a "shift completion position for EV" (via the first selection position), as described above, there exists no fork shaft whose shift head engages with the inner lever IL of the S&S shaft. Thus, the fork shafts FS1 and FS2 (i.e., the sleeves S1 and S2) are maintained at their "neutral positions." Accordingly, no power transmission system is established between the input shaft Ai and the output shaft Ao. Meanwhile, in this case, the sleeve Sm is located at the "connecting position" (see also FIG. 6) as described above. Accordingly, as indicated by a thick continuous line in FIG. 10, an MG torque for forward travel is transmitted to the drive wheels through the power transmission system between the motor generator M/G and the output shaft Ao.

Namely, when "EV" is selected, there is realized a state (namely, the above-mentioned "EV travel") in which the vehicle travels by utilizing the MG torque only while maintaining the engine E/G in a stopped state (a state in which the rotation of the output shaft Ae of the engine E/G stops). Namely, in this vehicle, the driver can start the vehicle in the forward direction by EV travel by selecting "EV." The MG torque is adjusted to a value for forward travel whose magnitude changes in accordance with the accelerator opening or the like.

Figure 12:
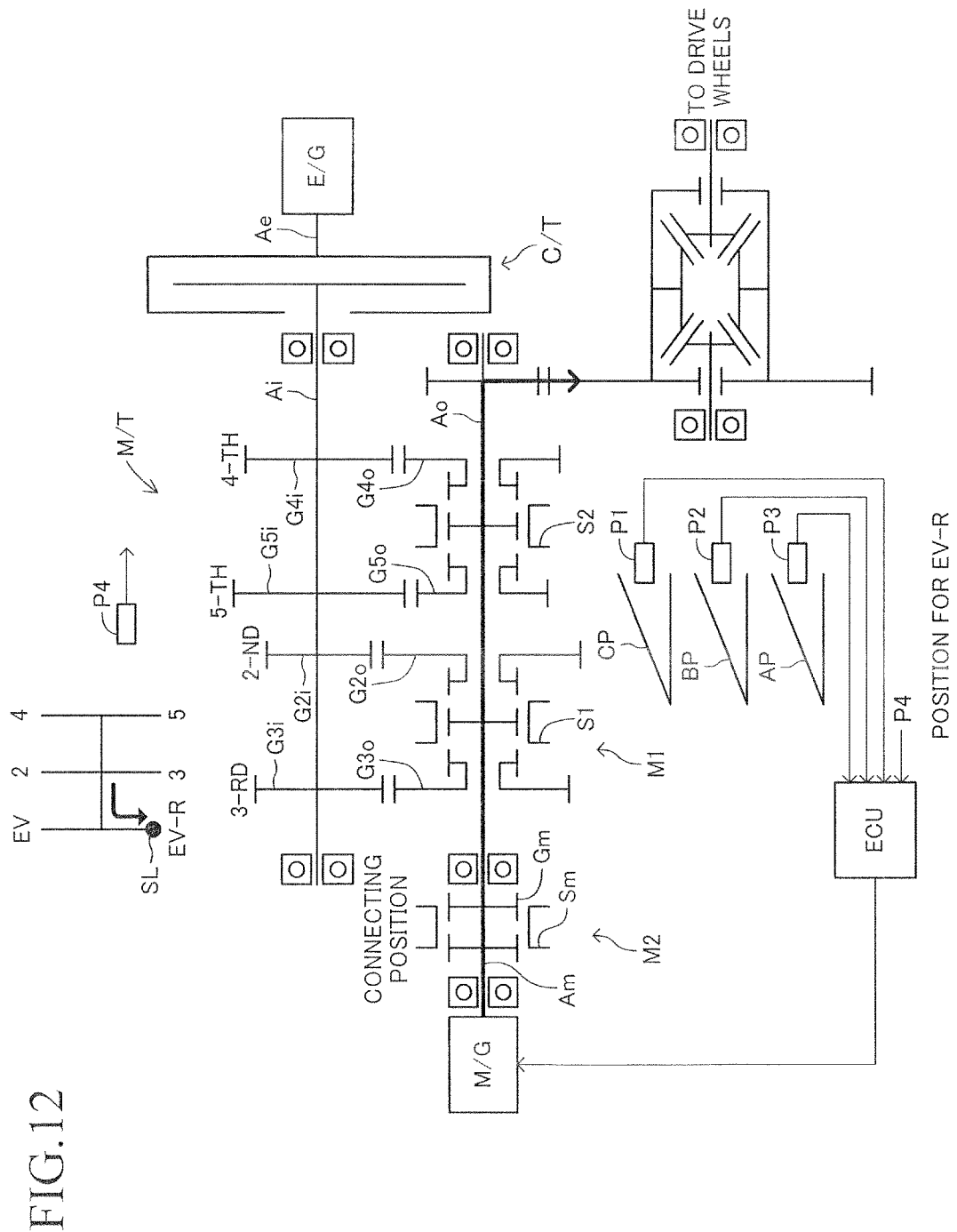
FIG. 12 is a diagram corresponding to FIG. 1 in a state in which a position for EV-R is selected.
Figure 13:
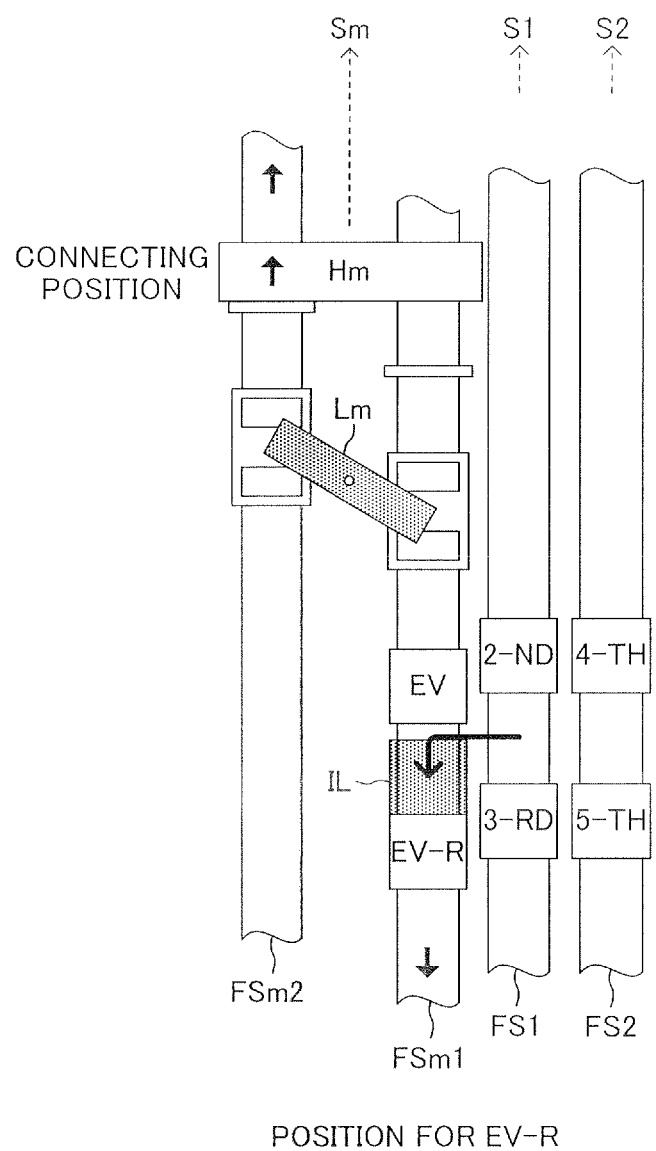
FIG. 13 is a diagram corresponding to FIG. 2 in a state in which the position for EV-R is selected.

As shown in FIGS. 12 and 13, in the case where the shift lever SL moves from the "N position" to a "shift completion position for EV-R" (via the first selection position), no shift head (i.e., fork shaft) engages with the inner lever IL as in the above-described case where "EV" is selected. Thus, the fork shafts FS1 and FS2 (i.e., the sleeves S1 and S2) are maintained at their "neutral positions." Accordingly, no power transmission system is established between the input shaft Ai and the output shaft Ao. Meanwhile, in this case, the sleeve Sm is located at the "connecting position" (see also FIG. 8) as described above. Accordingly, as indicated by a thick continuous line in FIG. 12, an MG torque for reverse travel is transmitted to the drive wheels through the power transmission system between the motor generator M/G and the output shaft Ao.

Namely, when "EV-R" is selected, the "EV travel" is realized. Namely, in this vehicle, the driver can start the vehicle in the reverse direction by EV travel by selecting "EV-R." The MG torque is adjusted to a value for reverse travel whose magnitude changes in accordance with the accelerator opening or the like.

Notably, distinction of the position of the shift lever SL among the "N position" (neutral range), the "shift completion position for EV," and the "shift completion position for EV-R" can be made on the basis of, for example, the result of detection by the shift position sensor P4 and the result of detection by a sensor which detects the position of the S&S shaft.

Figure 14:
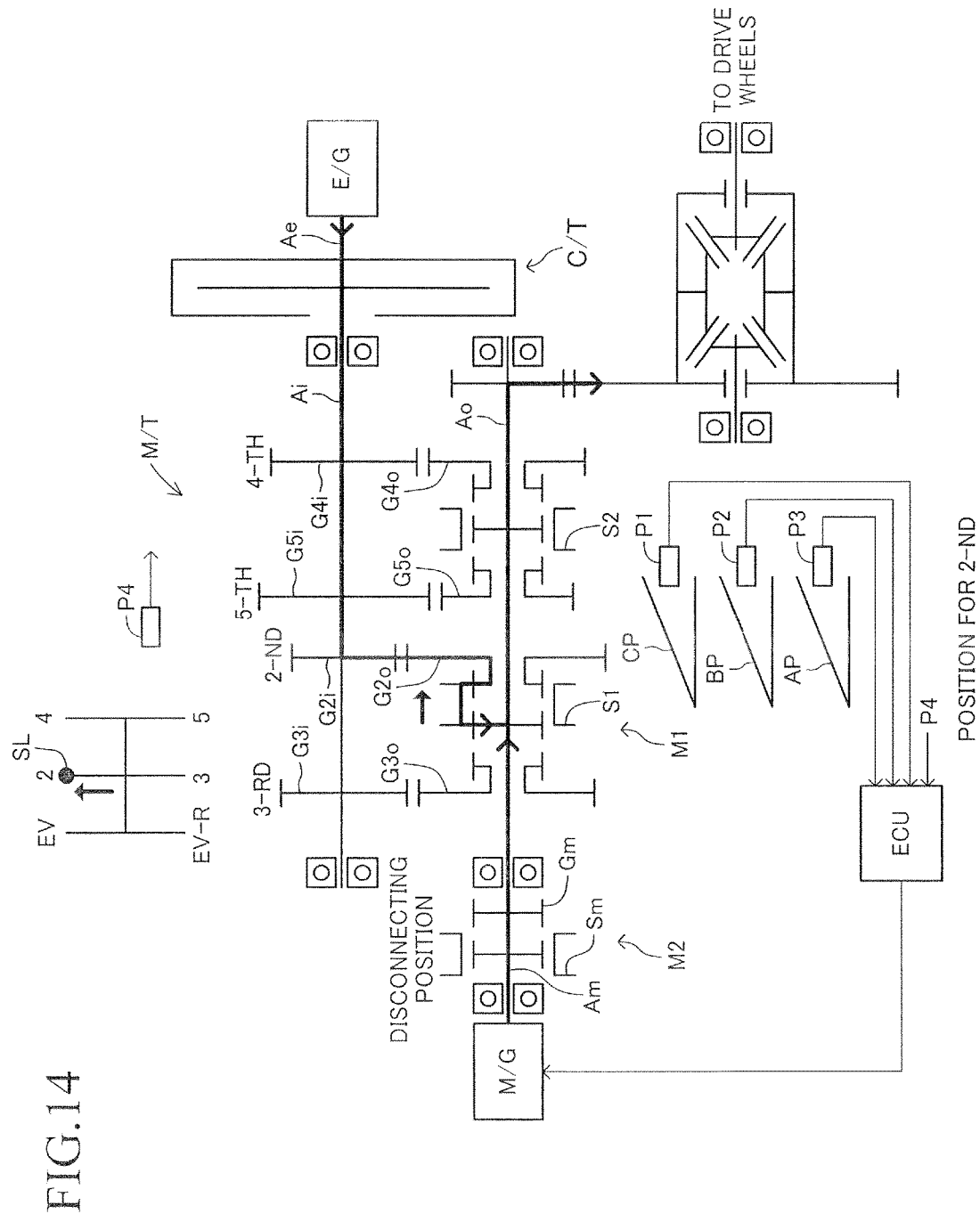
FIG. 14 is a diagram corresponding to FIG. 1 in a state in which a position for 2-nd is selected.
Figure 15:
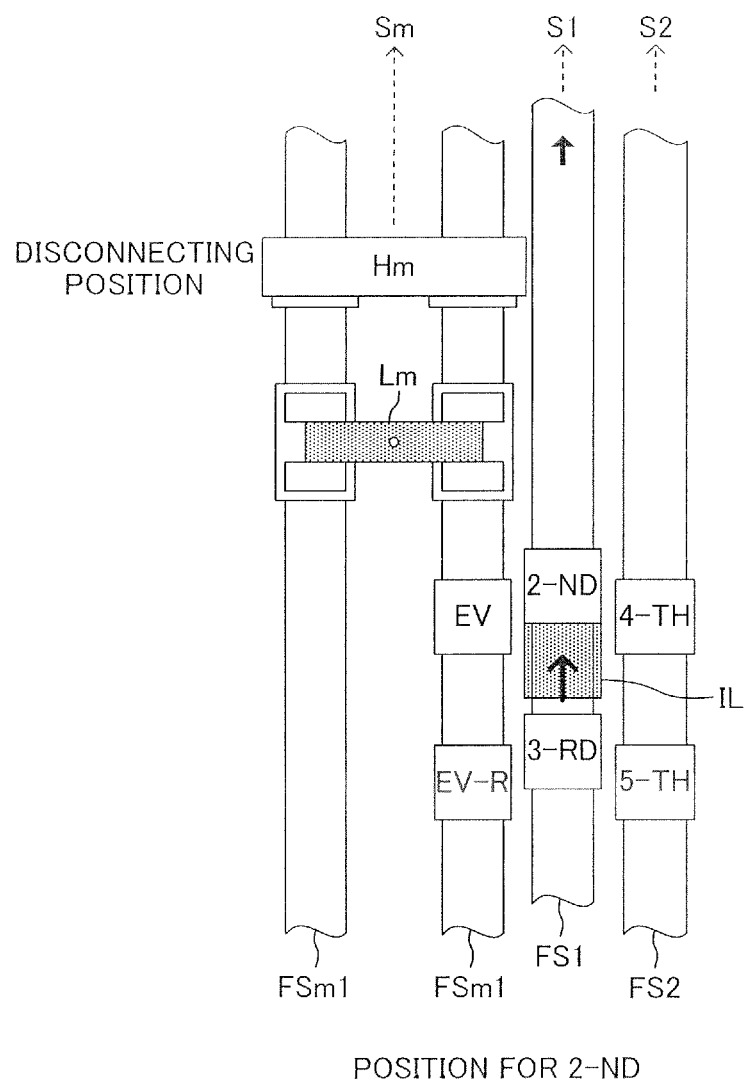
FIG. 15 is a diagram corresponding to FIG. 2 in a state in which the position for 2-nd is selected.
Figure 16:
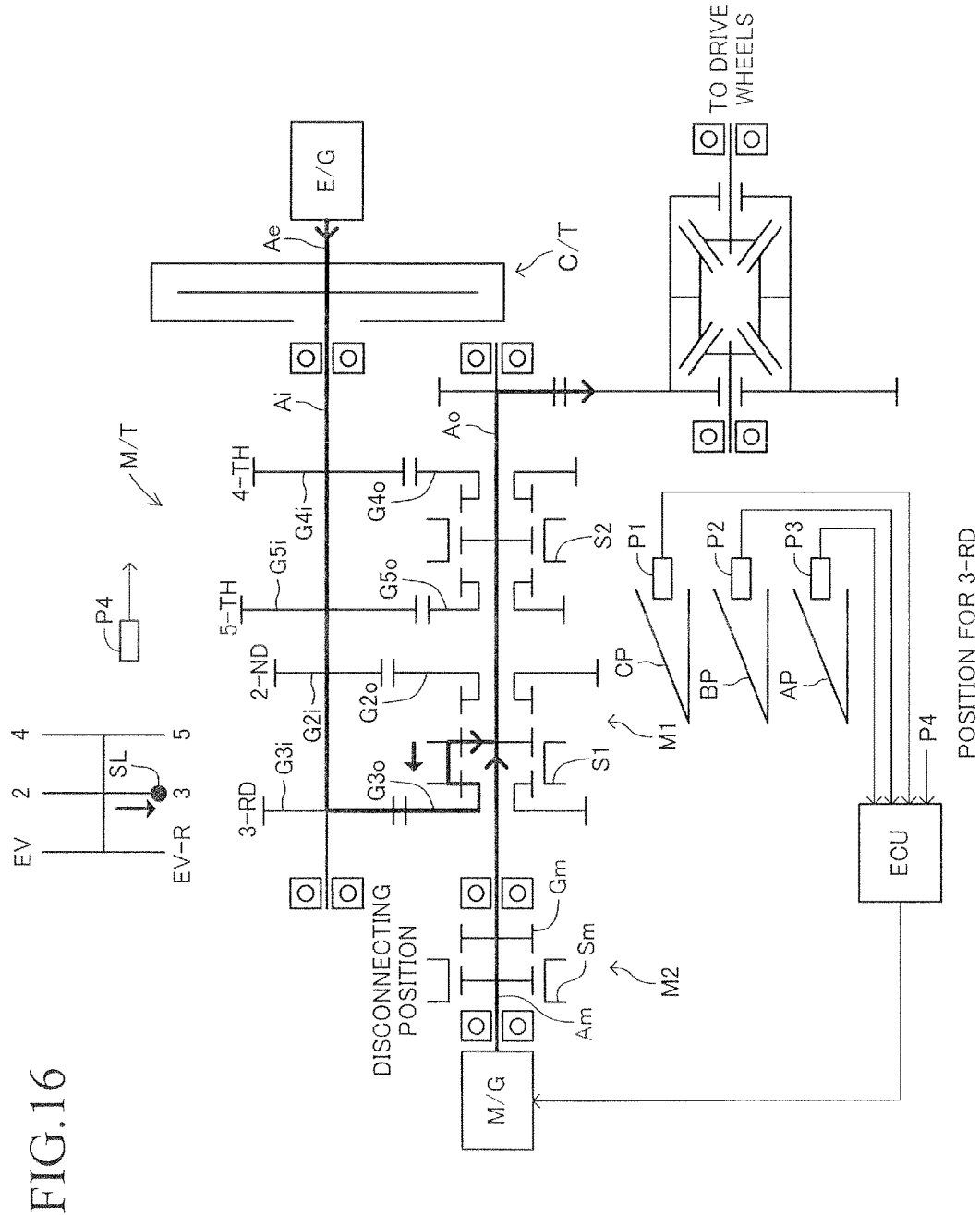
FIG. 16 is a diagram corresponding to FIG. 1 in a state in which a position for 3-rd is selected.
Figure 17:
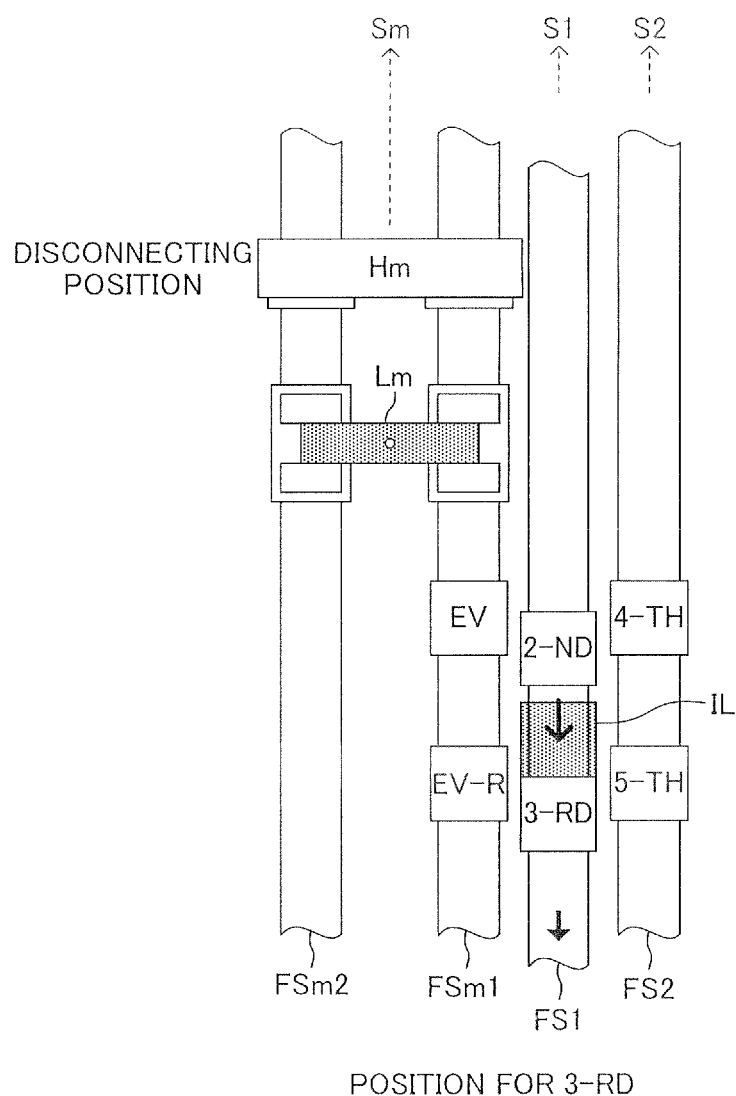
FIG. 17 is a diagram corresponding to FIG. 2 in a state in which the position for 3-rd is selected.
Figure 18:
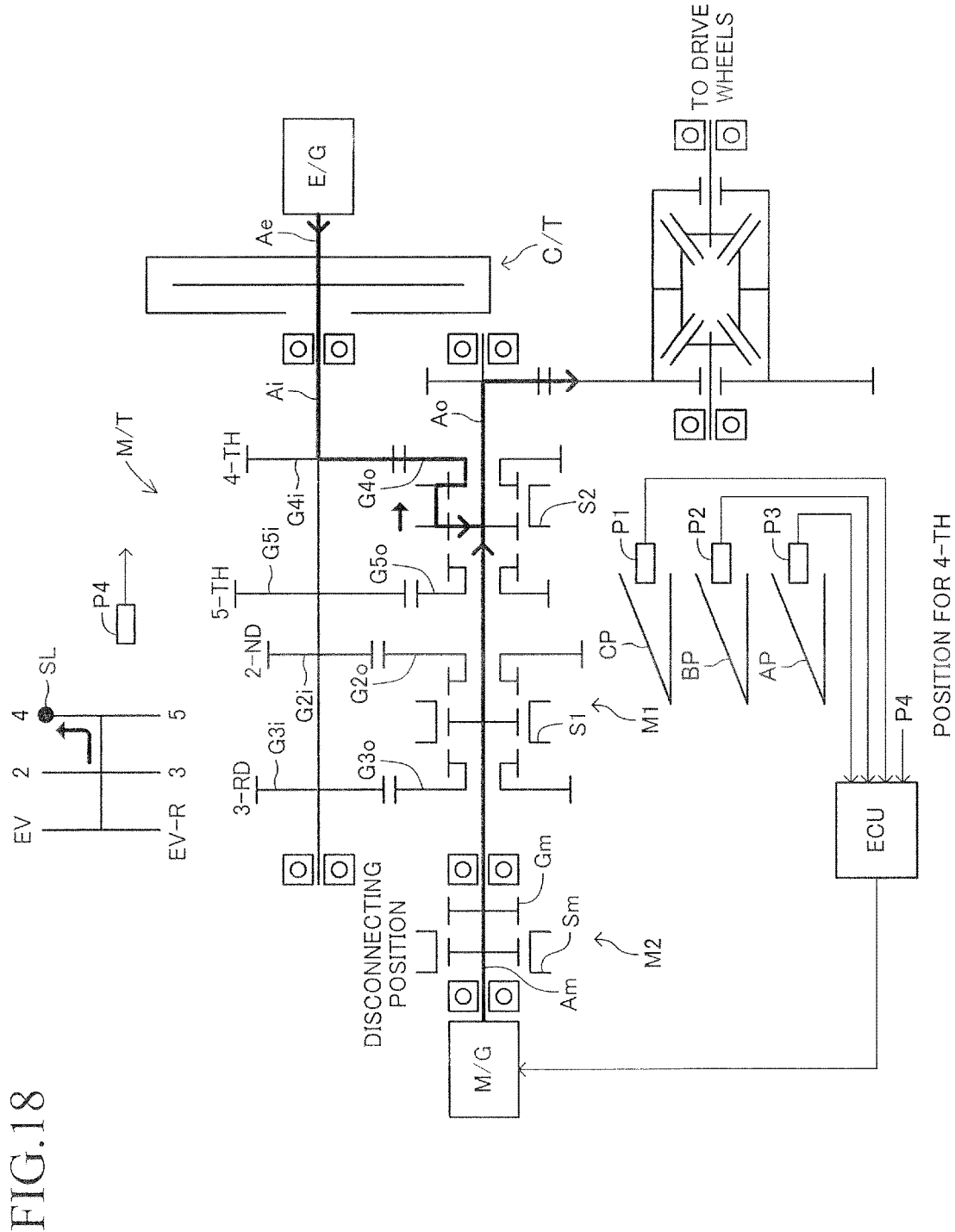
FIG. 18 is a diagram corresponding to FIG. 1 in a state in which a position for 4-th is selected.
Figure 19:
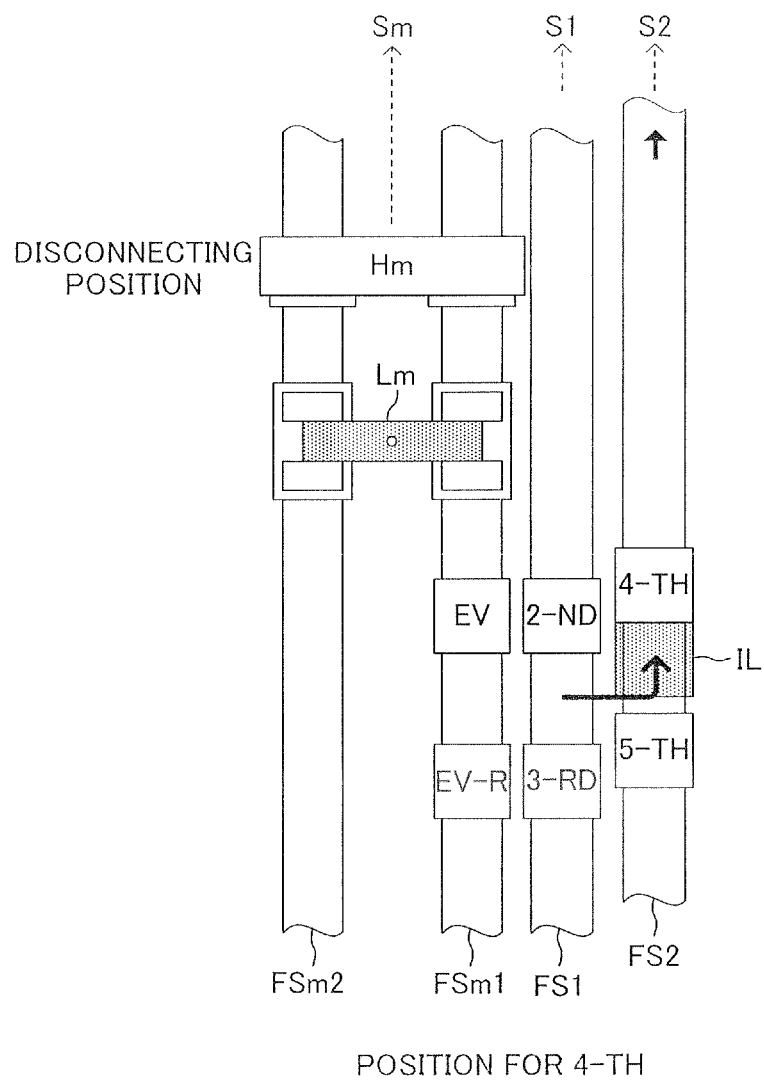
FIG. 19 is a diagram corresponding to FIG. 2 in a state in which the position for 4-th is selected.
Figure 20:
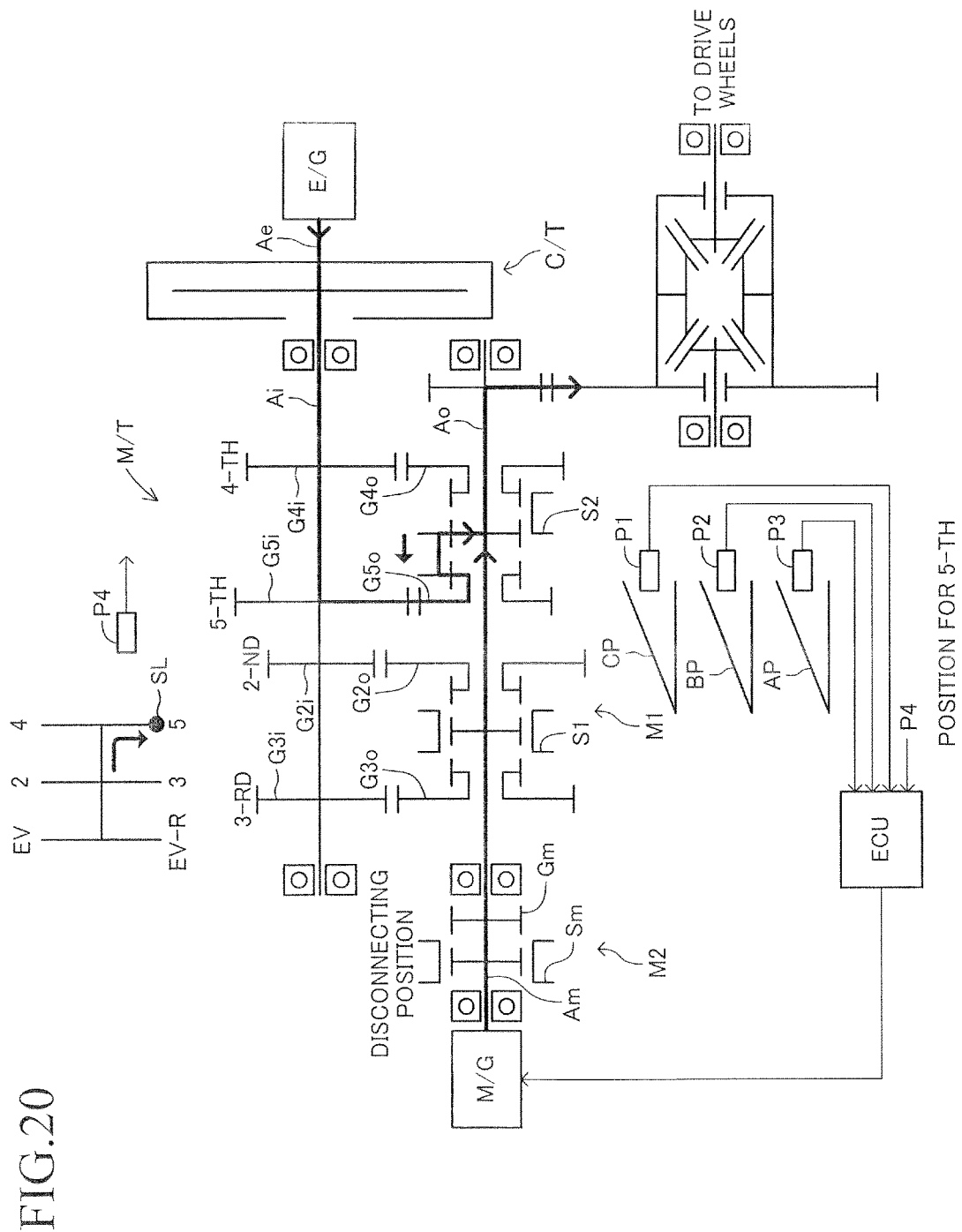
FIG. 20 is a diagram corresponding to FIG. 1 in a state in which a position for 5-th is selected.
Figure 21:
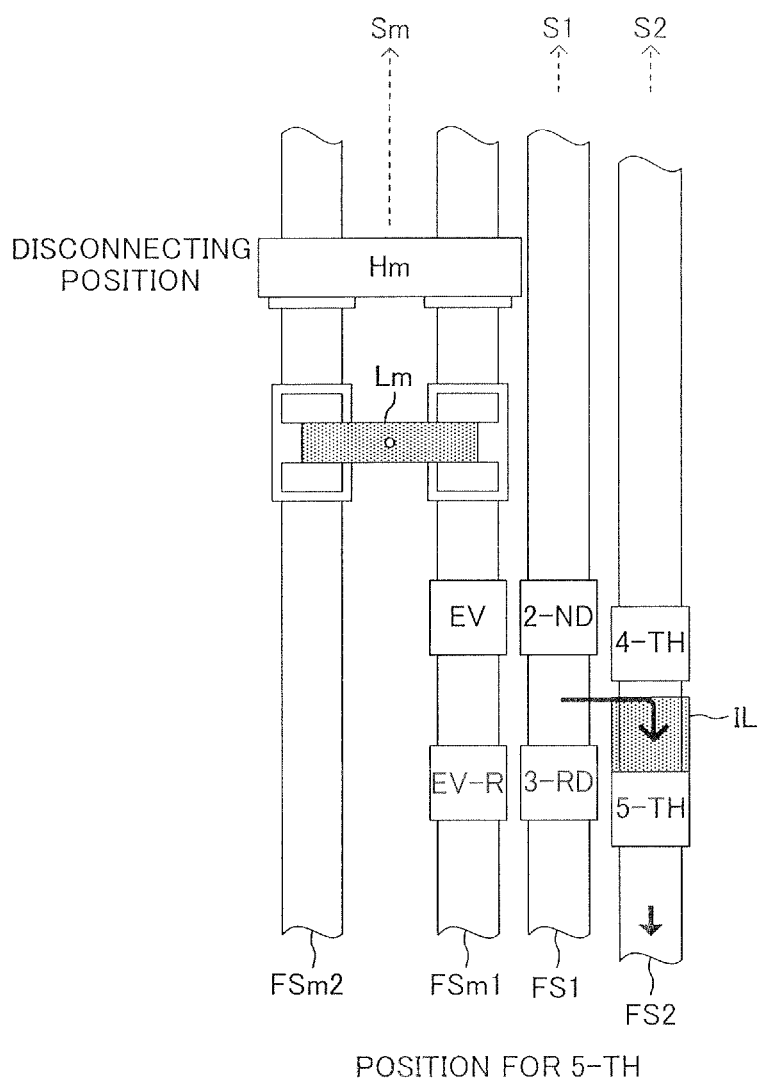
FIG. 21 is a diagram corresponding to FIG. 2 in a state in which the position for 5-th is selected.

As shown in FIGS. 14 and 15, when the shift lever SL moves from the "N position" to the "shift completion position for 2-nd," the inner lever IL of the S&S shaft drives the "2-nd-side engagement portion" of the head H1 connected to the fork shaft FS1 in the "2-nd" direction (in the upward direction in FIG. 15), whereby only the fork shaft FS1 (i.e., the sleeve S1) is driven (in the upward direction in FIG. 15, the rightward direction in FIG. 14). As a result, the sleeve S1 moves to the "position for 2-nd." The sleeve S2 is located at the "neutral position."

In this state, the sleeve S1 engages with an idle gear G2o and fixes the idle gear G2o to the output shaft Ao such that the idle gear G2o cannot rotate relative to the output shaft Ao. Also, the idle gear G2o is always meshed with a fixed gear G2i fixed to the input shaft Ai. As a result, as indicated by a thick continuous line in FIG. 14, in addition to the power transmission system between the motor generator M/G and the output shaft Ao, a power transmission system corresponding to "2-nd" is established between the input shaft Ai and the output shaft Ao through the gears G2i and G2o. Namely, in the case where "2-nd" is selected, there is realized a state (namely, the above-mentioned "HV travel")

in which the vehicle travels by utilizing both the EG torque transmitted through the clutch C/T and the MG torque.

Figure 23:
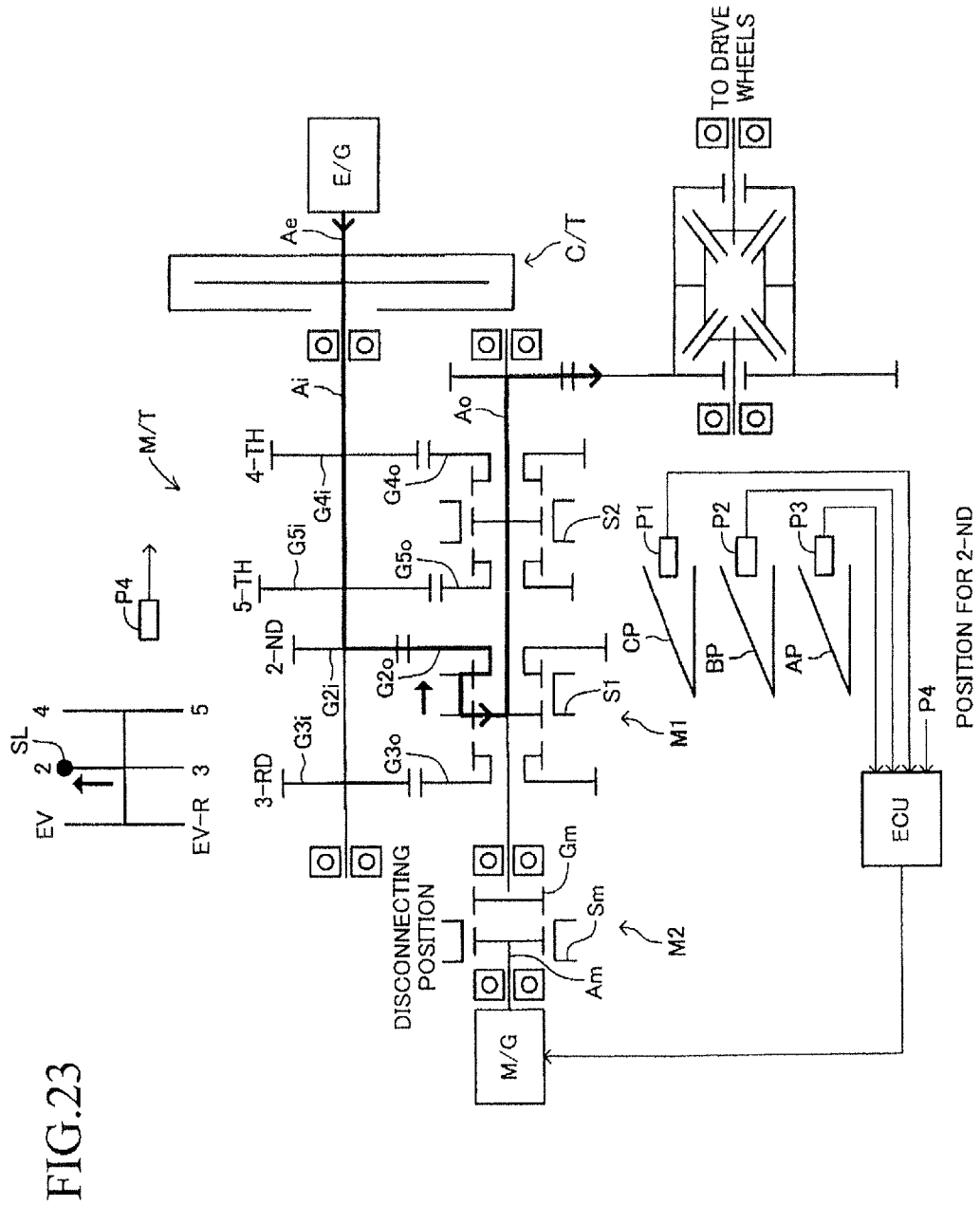
FIG. 23 is a diagram corresponding to FIG. 1 in a state in which the postion for 2-nd is selected for EG travel.

However, in the present example, when "2-nd" is selected, the sleeve Sm is located at the "disconnecting position" and accordingly, the MG shaft Am is disconnected from the output shaft Ao. Therefore, no power transmission system is established between the motor generator M/G and the output shaft Ao. Accordingly, instead of HV travel, a state in which the vehicle travels by utilizing the EG torque only (hereinafter referred to as "EG travel") is realized, as shown in FIG. 23.

Figure 24:
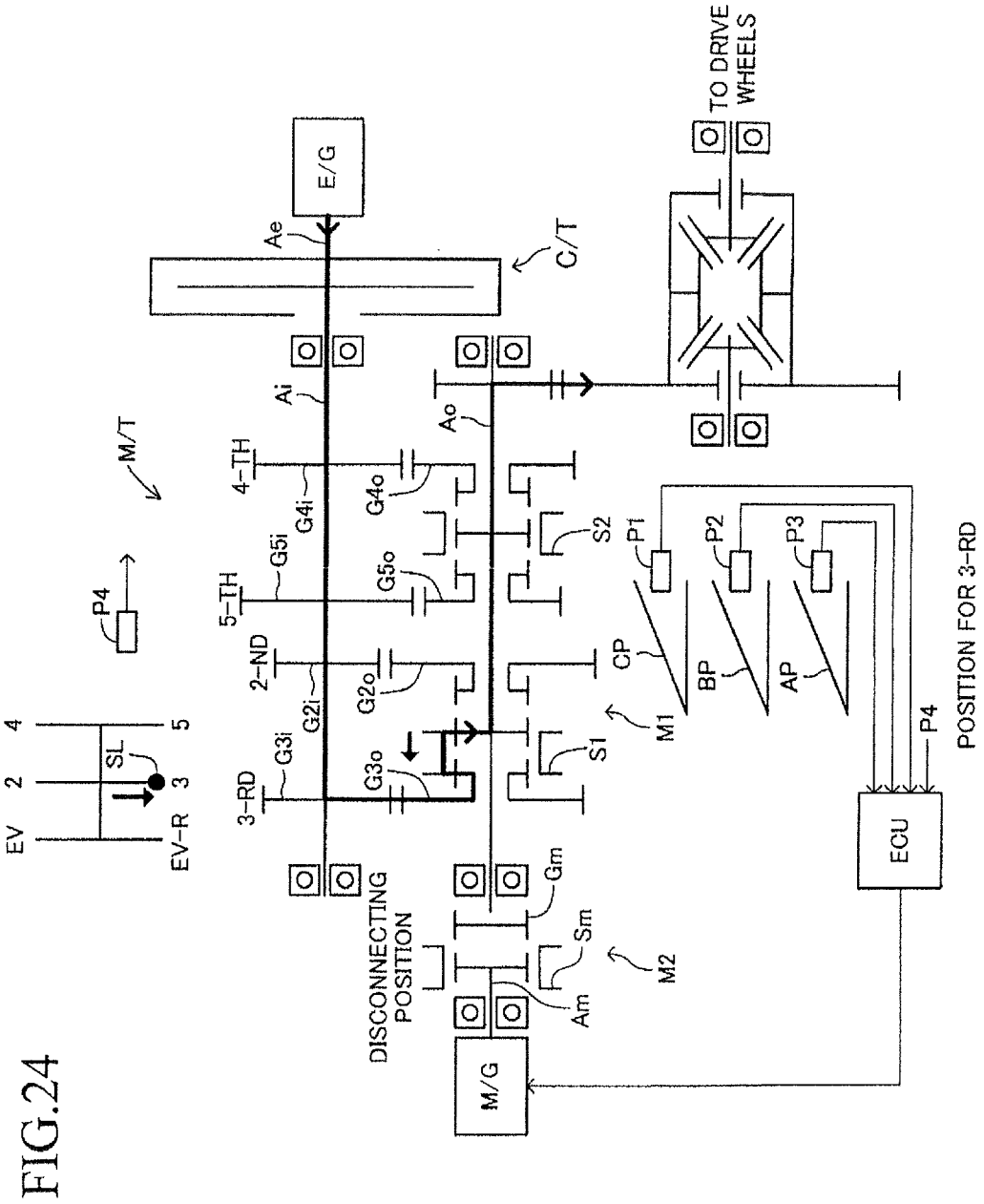
FIG. 24 is a diagram corresponding to FIG. 1 in a state in which the postion for 3-rd is selected for EG travel.
Figure 25:
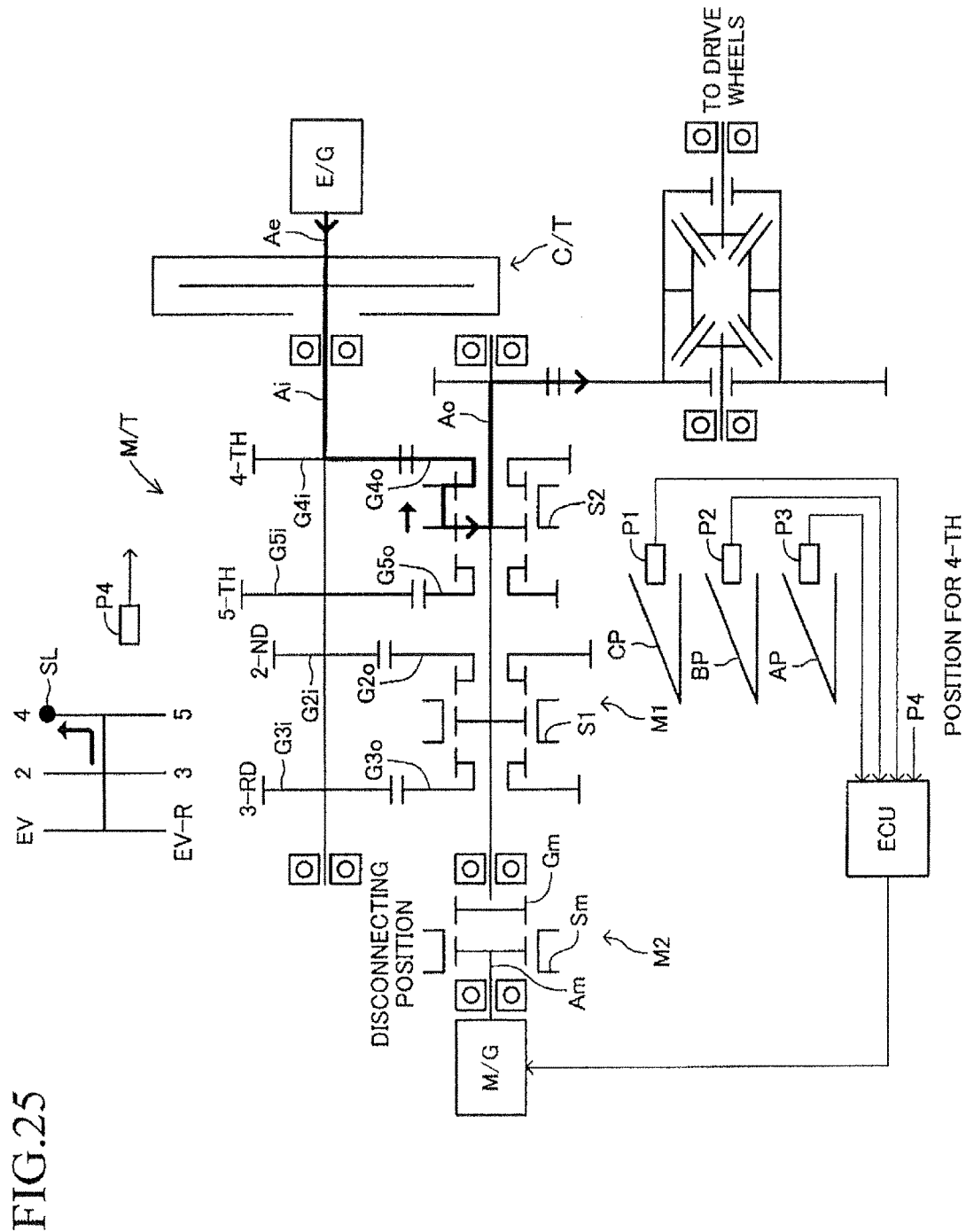
FIG. 25 is a diagram corresponding to FIG. 1 in a state in which the postion for 4-th is selected for EG travel.
Figure 26:
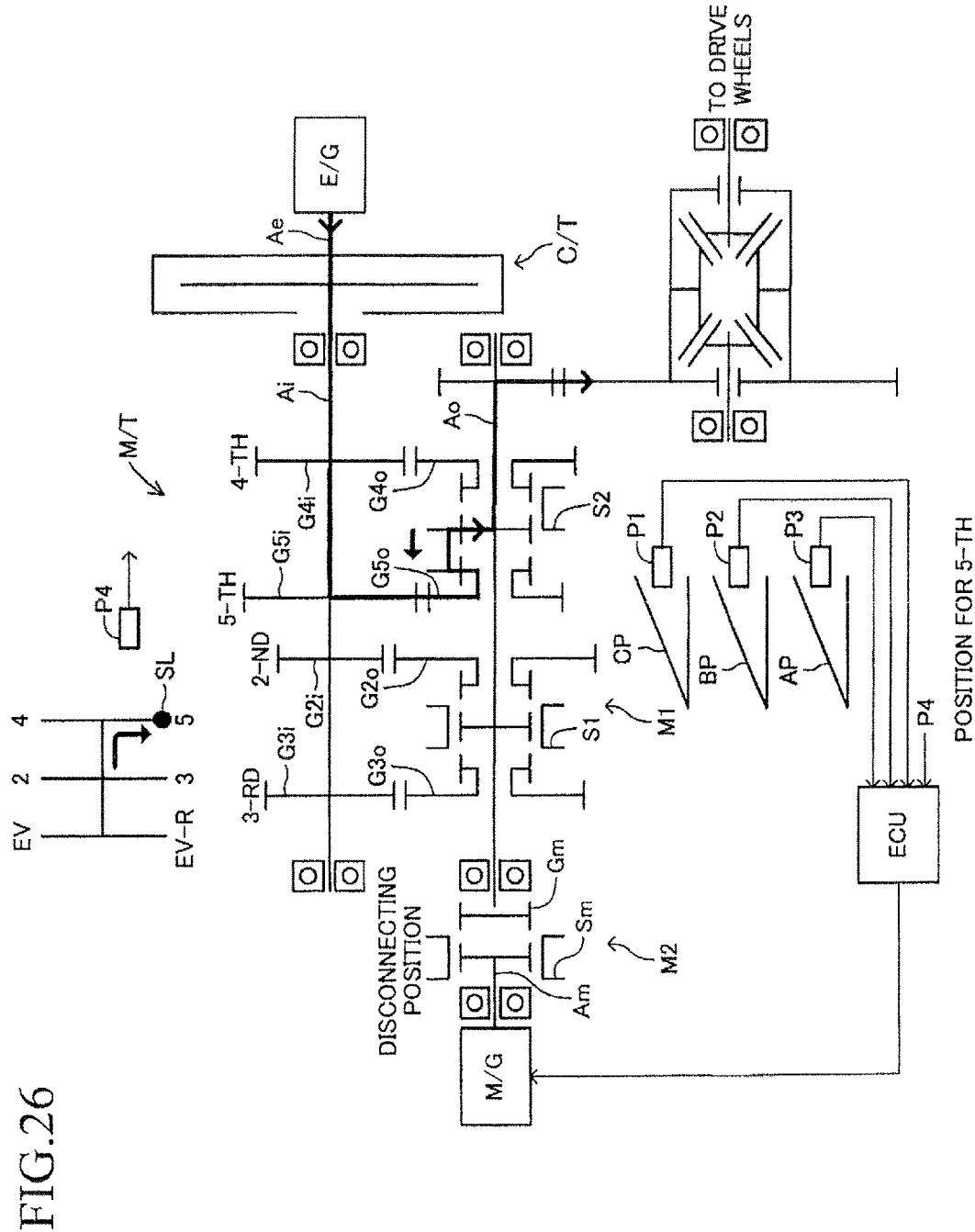
FIG. 26 is a diagram corresponding to FIG. 1 in a state in which the postion for 5-th is selected for EG travel.

As shown in FIGS. 16 to 21, in the case where the shift lever SL is located at the shift completion position for "3-rd," "4-th," or "5-th" as well, as in the case where the shift lever SL is located at the shift completion position for "2-nd," the above-mentioned "HV travel" is realized. Namely, when the shift lever SL is moved to the shift completion position for "3-rd" ("4-th," "5-th"), in addition to the power transmission system between the motor generator M/G and the output shaft Ao, a power transmission system corresponding to "3-rd" ("4-th," "5-th") is established between the input shaft Ai and the output shaft Ao through gears G3i and G3o (G4i and G4o, G5i and G5o). However, in the present example, in the case where "3-rd," "4-th," or "5-th" is selected as well, as in the case where the "2-nd" is selected, the sleeve Sm is located at the "disconnecting position." Accordingly, instead of HV travel, EG travel is realized, as shown in FIGS. 24-26, respectively.

As described above, in the present example, "EV" and "EV-R" are EV travel gear stages, and "2-nd" through "5-th" are HV travel gear stages. Notably, for the system for transmitting the EG torque, the "ratio of the rotational speed of the input shaft Ai to that of the output shaft Ao" will be referred to as an "MT speed reduction ratio." The MT speed reduction ratio (the number of teeth of GNo/the number of teeth of GNi) (N: 2 to 5) decreases gradually from "2-nd" toward "5-th."

Notably, in the above-described example, the axial positions of the sleeves S1 and S2 are mechanically adjusted in accordance with the shift position of the shift lever SL through utilization of a link mechanism (the S&S shaft and the fork shafts) or the like which mechanically connects the shift lever SL and the sleeves S1 and S2. However, the axial positions of the sleeves S1 and S2 may be electrically adjusted by making use of drive force of an actuator which operates on the basis of the result of detection by the shift position sensor P4 (so-called by-wire scheme).

(Control of the Engine E/G)

The control of the engine E/G by the present apparatus is generally performed as follows. When the vehicle is stopped or when "N," "EV," or "EV-R" is selected, the engine E/G is maintained in a stopped state (a state in which fuel injection is not performed). When an HV travel gear stage (any of "2-nd" to "5-th") is selected in a state in which the engine E/G is stopped, the engine E/G is started (fuel injection is started). In periods during which the engine E/G is operating (fuel injection is being performed), the EG torque is controlled on the basis of the accelerator opening, etc. When "N," "EV," or "EV-R" is selected or the vehicle stops in a state the engine E/G is operating, the engine E/G is returned to the stopped state.

(Control of the Motor Generator M/G)

The control of the motor generator M/G by the present apparatus is generally performed as follows. When the vehicle is stopped or "N" is selected, the motor generator M/G is maintained in a stopped state (the MG torque=0). When "EV" or "EV-R" is selected, the MG torque is adjusted to a value for EV travel on the basis of the accelerator opening, the clutch stroke, etc. (MG torque control for EV travel). Meanwhile, when an HV travel gear stage (any of "2-nd" through "5-th") is selected (so long as the sleeve Sm is located at the connecting position as in the modification shown in FIG. 22 to be described later), the MG torque is adjusted to a value for HV travel on the basis of the accelerator opening, the clutch stroke, etc. (MG torque control for HV travel). The MG torque control for EV travel and the MG torque control for HV travel differ from each other in terms of the magnitude of the adjusted MG torque. When "N" is selected or the vehicle is stopped, the motor generator M/G is again returned to a stopped state.

(Action and Effects)

As described above, the manual transmission M/T according to the embodiment of the present invention allows not only forward starting performed through utilization of EV travel but also reverse starting performed through utilization of EV travel. As a result, not only the gear pair for 1-st for forward travel (specifically, a combination of a fixed gear for 1-st and a free-rotating gear for 1-st which are always meshed with each other), but also the gear pair for reverse travel (specifically, a combination of a fixed gear for reverse travel, a free-rotating gear for reverse travel, an idle gear, etc.) is eliminated (see FIG. 1, etc.). Accordingly, as compared with a transmission which includes both of the gear pair for 1-st for forward travel and the gear pair for reverse travel, the entire transmission can be made more compact.

Also, in the above-described embodiment, on the H-type shift pattern, the "shift completion position for EV" and the "shift completion position for EV-R" are disposed at the opposite ends of a common (same) shift line. In general, fork shafts which are equal in number to the shift lines present on the H-type shift pattern are required. In contrast, according to the above-described configuration, the transmission includes only two fork shafts in spite of employment of an H-type shift pattern having three shift lines (see FIG. 2, etc.). Namely, the number of required fork shafts can be reduced by one, whereby the entire transmission can be made further compact.

Moreover, in the above-described embodiment, when an EV travel gear stage ("EV" or "EV-R") is selected, the "connected state" in which the MG shaft Am is fixedly connected to the output shaft Ao is realized; and when an EG travel gear stage (any of "2-nd" through "5-th") is selected, the "disconnected state" in which the MG shaft Am is disconnected from the output shaft Ao is realized, as shown in FIGS. 23-26. Accordingly, there does not occur a situation in which the motor generator M/G is continuously operated at high speed, for example, when a gear stage for high speed travel (5-th or the like) among the EG travel gear stages is established and the vehicle is traveling at high speed. Therefore, occurrence of a situation in which the motor generator M/G is continuously operated at high speed can be restrained. As a result, occurrence of a situation in which the temperature of the motor generator M/G becomes excessively high can be restrained.

The present invention is not limited to the above-described embodiment, and various modifications may be employed without departing from the scope of the present invention. For example, in the above-described embodiment, both of the sleeves S1 and S2 are provided on the input shaft Ai. However, both of the sleeves S1 and S2 may be provided on the output shaft Ao. Alternatively, one of the sleeves S1 and S2 may be provided on the output shaft Ao, and the other sleeve may be provided on the input shaft Ai. Also, the order of arrangement of the plurality of gear pairs disposed on the input shaft Ai and the output shaft Ao may differ from that employed in the above-described embodiment.

In the above-described embodiment, the "shift completion position for EV" and the "shift completion position for EV-R" are disposed at opposite ends of a common (same) shift line. However, the "shift completion position for EV" and the "shift completion position for EV-R" may be disposed at ends of different shift lines.

In the above-described embodiment, a single EV travel gear stage for forward travel and a single EV travel gear stage for reverse travel are provided on the shift pattern as a plurality of EV travel gear stages. However, a plurality of EV travel gear stages for forward travel or a plurality of EV travel gear stages for reverse travel may be provided. In this case, preferably, the "ratio of the rotational speed of the output shaft of the motor generator M/G to that of the output shaft Ao" (MG speed reduction ratio) is changed among the plurality of EV travel gear stages for forward travel or reverse travel.

Figure 22:
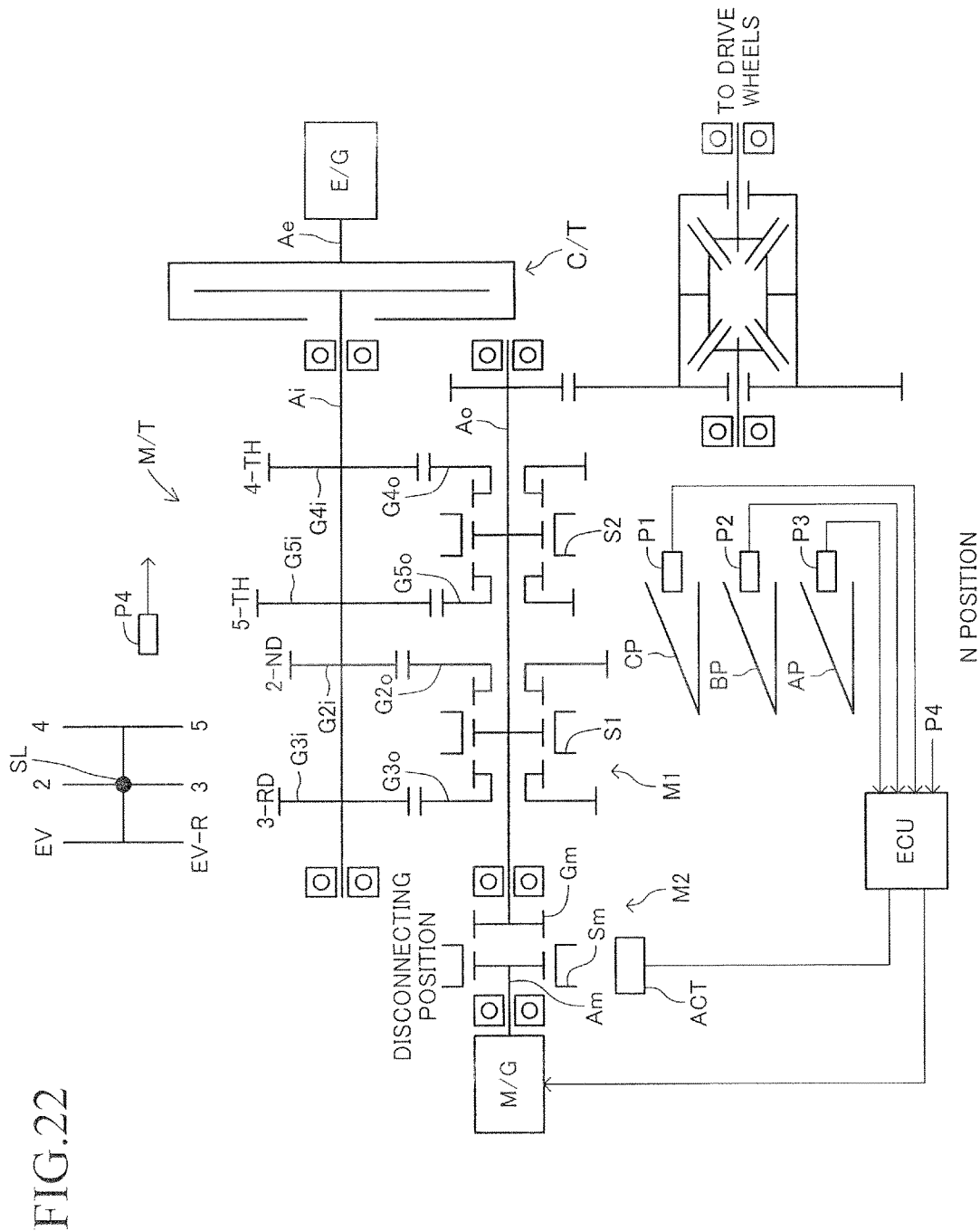
FIG. 22 is a diagram corresponding to FIG. 1 and showing a power transmission control apparatus for an HV-MT vehicle according to a modification of the embodiment of the present invention.

In the above-described embodiment, the connection changeover mechanism M2 is configured mechanically, and the sleeve Sm is driven mechanically. However, as shown in FIG. 22, the embodiment may be modified such that the connection changeover mechanism M2 is configured electrically, and the sleeve Sm is driven electrically by an actuator ACT controlled by the ECU.

In this case, like the above-described embodiment, the manual transmission may be configured such that the "connected state" is realized when an EV travel gear stage ("EV" or "EV-R") is selected, and the "disconnected state" is always realized when an HV travel gear stage (any of "2-nd" through "5-th") is selected. Alternatively, the manual transmission may be configured such that when an HV travel gear stage (any of "2-nd" through "5-th") is selected, the "connected state" or the "disconnected state" is selectively realized on the basis of the state of heat generation of the motor generator M/G.

Specifically, the manual transmission may be configured such that in the case where an HV travel gear stage (any of "2-nd" through "5-th") is selected, the "connected state" is realized if the temperature of the motor generator M/G is lower than a predetermined value, and the "disconnected state" is realized if the temperature of the motor generator M/G is equal to or higher than a predetermined value. Alternatively, the manual transmission may be configured such that in the case where an HV travel gear stage (any of "2-nd" through "5-th") is selected, the "connected state" is realized if a gear stage for low speed travel (e.g., "2-nd" or "3-rd") is selected, and the "disconnected state" is realized if a gear stage for high speed travel (e.g., "4-th" or "5-th") is selected.

The invention claimed is:

1. A manual transmission (M/T) having no torque converter, which is applied to a vehicle including an internal combustion engine (E/G) and an electric motor (M/G) as power sources, comprising:
   an input shaft (Ai) to which power is input from the internal combustion engine;
   an output shaft (Ao) to which power is input from the electric motor and from which power is output to a drive wheel of the vehicle;
   a transmission speed change mechanism (M1) configured such that, when a shift operation member (SL) operated by a driver moves, on a shift pattern, to each of E/G travel shift completion positions corresponding to a plurality of E/G travel gear stages (2-nd to 5-th) for traveling by using only a drive force of the internal combustion engine, the transmission speed change mechanism establishes a power transmission system between the input shaft and the output shaft such that a transmission speed reduction ratio, which is the ratio of rotational speed of the input shaft to that of the output shaft, is set to a value corresponding to a corresponding E/G travel gear stage, and when the shift operation member moves, on the shift pattern, to each of motor travel shift completion positions corresponding to a plurality of motor travel gear stages (EV, EV-R) for traveling by using the drive force of the electric motor only of the drive forces of the internal combustion engine and the electric motor, the transmission speed change mechanism establishes no power transmission system between the input shaft and the output shaft, the transmission speed change mechanism including, as the plurality of motor travel gear stages, at least one motor travel gear stage for forward travel and at least one motor travel gear stage for reverse travel; and
   a connection changeover mechanism (M2) which selectively realizes a connected state in which the output shaft (Am) of the electric motor is connected to the output shaft (Ao) of the transmission in a power transmissible manner and a disconnected state in which the output shaft (Am) of the electric motor is not connected to the output shaft (Ao) of the transmission in a power transmissible manner,
   wherein the connection changeover mechanism is configured to always realize the connected state when the shift operation member is located at each of the shift completion positions of the motor travel gear stages for forward travel and reverse travel, and to always realize the disconnected state when the shift operation member is located at each of the shift completion positions of the E/G travel gear stages, and
   wherein the shift pattern includes:
   a single selection line extending in a left-right direction of the vehicle which is a path along which the shift operation member moves in the left-right direction of the vehicle as a result of a selection operation, which is an operation of the shift operation member in the left-right direction of the vehicle, in a neutral state in which no power transmission system is established between the input shaft and the output shaft; and
   a plurality of shift lines each of which is a path along which the shift operation member moves in a front-rear direction of the vehicle as a result of a shift operation, which is an operation of the shill operation member in the front-rear direction of the vehicle, from a corresponding one of a plurality of selection positions on the selection line, each shift line extending from the corresponding selection position toward one side or both sides with respect to the front-rear direction of the vehicle, and a corresponding shift completion position being disposed at each end of each shift line;
   wherein the transmission speed change mechanism includes, as the plurality of motor travel gear stages, one motor travel gear stage for forward travel and one motor travel gear stage for reverse travel;
   the motor travel gear stage for forward travel and the motor travel gear stage for reverse travel share a corresponding common selection position for motor travel among the plurality of selection positions, the shift completion position of the motor travel gear stage for forward travel being disposed at one of opposite ends of a motor travel shift line, among the plurality of shift lines, which extends from the motor travel selection position toward both sides with respect to the front-rear direction of the vehicle, and shift completion position of the motor travel gear stage for reverse travel being disposed at the other of the opposite ends of the motor travel shift line; and the plurality of E/G travel gear stages have at lease one E/G travel selection position which is one of the plurality of selection positions and differs from the motor travel selection position, E/G travel shift completion position being disposed at and corresponding to each end of at least one E/G travel shift line, among the plurality of shift lines, which extends from the at least one E/G travel selection position, wherein he transmission speed change mechanism includes:

a plurality of fixed gears(G2$i$, G3$i$, G4$i$, G5$i$) which are non-rotatably provided on the input shall (Ai) or the output shaft (Ao) and which correspond to the plurality of E/G travel gear stages;

a plurality of idle gears (G2$o$, G3$o$, G4$o$, G5$o$) which are rotatably provided on the input shaft or the output shaft, which correspond to the plurality of E/G travel gear stages, and which are always meshed with the fixed gears of the corresponding E/G travel gear stages;

a plurality of sleeves (S1, S2) which are non-rotatably and axially movably provided on the corresponding shaft of the input and output shafts and each of which can be engaged with the corresponding idle gear of the plurality of idle gears so as to fix the corresponding idle gear to the corresponding shaft such that the corresponding idle gear cannot rotate relative to the corresponding shaft;

a plurality of fork shafts (FS1, FS2) each of which is connected to a corresponding one of the plurality of sleeves and can move in an axial direction thereof; and a shift and selection shaft which is moved in an axial direction thereof or is rotated about its axis as a result of the selection operation of the shift operation member, and is rotated about its axis or is moved in the axial direction as a result of the shift operation of the shift operation member, wherein when the shift operation member is located at the E/G travel selection position as a result of the selection operation, a corresponding fork shaft is selected from the plurality of fork shafts, and an inner lever (IL) projecting from a side surface of the shift and selection shaft pushes and moves the selected fork shaft in the axial direction thereof as a result of the shift operation of the shift operation member, whereby the corresponding E/G travel gear stage is realized; and when the shift operation member is located at the motor travel selection position as a result of the selection operation, no fork shaft is selected from the plurality of fork shafts, and wherein the connection changeover mechanism includes:

a movable member (Hm) which can be moved, the disconnected state and the connected state being selectively realized in accordance with the position of the movable member (Hm);

a first shaft (FSm1) which moves in its axial direction when it is pushed by the inner lever (IL) as a result of the shift operation of the shift operation member from the motor travel selection position;

a second shaft (FSm2) which is disposed parallel to the first shaft and which is coupled with the first shaft via a link mechanism (Lm) such that when the first shaft moves toward one side along the axial direction, the second shaft moves toward the other side along the axial direction; and a coupling mechanism (Hm, P, Gm1, Gm2) which fixedly couples the movable member with the first shaft when the shift operation member moves between the motor travel selection position and the shift completion position of the motor travel gear stage for forward travel, and which fixedly couples the movable member with the second shaft when the shift operation member moves between the motor travel selection position and the shift completion position of the motor travel gear stage for reverse travel.

* * * * *